United States Patent
Sangster

(10) Patent No.: US 8,792,685 B2
(45) Date of Patent: Jul. 29, 2014

(54) PRESENTING IMAGE SUBSETS BASED ON OCCURRENCES OF PERSONS SATISFYING PREDETERMINED CONDITIONS

(75) Inventor: Rob Sangster, Mosman (AU)

(73) Assignee: Canon Kabushiki Kaisha, Tokyo (JP)

( * ) Notice: Subject to any disclaimer, the term of this patent is extended or adjusted under 35 U.S.C. 154(b) by 969 days.

(21) Appl. No.: 12/644,375

(22) Filed: Dec. 22, 2009

(65) Prior Publication Data

US 2010/0156834 A1   Jun. 24, 2010

(30) Foreign Application Priority Data

Dec. 24, 2008   (AU) ................................. 2008264197

(51) Int. Cl.
*G06K 9/00* (2006.01)

(52) U.S. Cl.
USPC .......................... 382/118; 382/224; 382/282

(58) Field of Classification Search
USPC .......................................... 382/118, 224, 282
See application file for complete search history.

(56) References Cited

U.S. PATENT DOCUMENTS

| | | | | |
|---|---|---|---|---|
| 7,286,723 B2 * | 10/2007 | Taugher et al. | ............... | 382/305 |
| 7,382,903 B2 * | 6/2008 | Ray | ................ | 382/118 |
| 7,751,597 B2 * | 7/2010 | Gabara | ................ | 382/116 |
| 8,004,573 B2 * | 8/2011 | Watanabe | ................ | 348/211.99 |
| 8,488,847 B2 * | 7/2013 | Nozaki et al. | ................ | 382/118 |
| 8,498,450 B2 * | 7/2013 | Nakanishi | ................ | 382/118 |
| 2003/0210808 A1 * | 11/2003 | Chen et al. | ................ | 382/118 |
| 2004/0239777 A1 * | 12/2004 | Nakamura et al. | ............ | 348/239 |
| 2005/0105803 A1 * | 5/2005 | Ray | ................ | 382/209 |
| 2006/0055977 A1 * | 3/2006 | Shiota et al. | ................ | 358/1.18 |
| 2006/0259863 A1 | 11/2006 | Obrador | ................ | 715/723 |
| 2006/0280427 A1 | 12/2006 | Snowdon et al. | ............... | 386/46 |
| 2007/0165967 A1 * | 7/2007 | Ando et al. | ................ | 382/291 |
| 2007/0177805 A1 * | 8/2007 | Gallagher | ................ | 382/190 |
| 2007/0297649 A1 * | 12/2007 | Nakanishi | ................ | 382/118 |
| 2008/0086688 A1 * | 4/2008 | Chandratillake et al. | ..... | 715/719 |
| 2008/0130960 A1 * | 6/2008 | Yagnik | ................ | 382/118 |
| 2009/0135269 A1 * | 5/2009 | Nozaki et al. | ............ | 348/222.1 |
| 2010/0020224 A1 * | 1/2010 | Hattori et al. | ............ | 348/333.11 |
| 2010/0268594 A1 * | 10/2010 | Tung et al. | ................ | 705/14.42 |

* cited by examiner

*Primary Examiner* — Jayesh A Patel

(74) *Attorney, Agent, or Firm* — Fitzpatrick, Cella, Harper & Scinto

(57) ABSTRACT

Methods and systems for selecting one or more images from a plurality of captured images are disclosed. One method comprises the steps of: analysing the plurality of captured images to recognise faces in the captured images using a facial recognition process (step 304); updating a count variable relating to a unique face each time the face is recognised in the captured images; selecting one or more unique faces when the related count variable satisfies a predetermined condition (step 308); and selecting a reduced number of the images which together include at least one instance of each of the selected faces (step 310).

16 Claims, 19 Drawing Sheets

| Face ID | Facial Measures | Count | Images |
|---|---|---|---|
| 00001 | $X_1, Y_1, Z_1,...$ | 68 | A00001.jpg, A00683.jpg, A00762.jpg,... |
| 00002 | $X_2, Y_2, Z_2,...$ | 2 | A00029.jpg, A00181.jpg |
| 00003 | $X_3, Y_3, Z_3,...$ | 181 | A00110.jpg, A00383.jpg, A00432.jpg,... |
| n | $X_n, Y_n, Z_n,...$ | 19 | A00001.jpg, A00221.jpg, A00762.jpg,... |

Fig. 9

| Geographic Location | Images |
| --- | --- |
| Location 1<br>12.34, -98.76 | A00001.jpg, A00683.jpg, A00762.jpg,... |
| Location 2<br>58.20, -11.66 | A00029.jpg, A00181.jpg |
| ⋮ | ⋮ |
| n | A00001.jpg, A00221.jpg, A00762.jpg,... |

Fig. 17A

PRESENTING IMAGE SUBSETS BASED ON OCCURRENCES OF PERSONS SATISFYING PREDETERMINED CONDITIONS

REFERENCE TO RELATED PATENT APPLICATIONS

This application claims the benefit under 35 U.S.C. §119 of the filing date of Australian Patent Application No. 2008264197, filed 24 Dec. 2008, hereby incorporated by reference in its entirety as if fully set forth herein.

TECHNICAL FIELD

The present invention relates generally to the management of images and more particularly to methods of automatically selecting images from a collection of images using facial recognition.

BACKGROUND

The prevalence of modern digital cameras enables users to capture a large number of digital photographs and store them on the camera before they are eventually saved or printed. This is partly due to advancements in compact flash-based digital storage, which have made large digital camera storage accessible to retail consumers.

The ability to capture and store a large quantity of unclassified images which tends to accumulate in a user's digital photograph collection, however, poses difficulties for users in selecting images for printing or other purposes. For example, manually searching through an unclassified collection of photographs to select particular photographs for printing or further processing can be tedious and/or time consuming. This problem is further exacerbated when groups of the photographs are substantially similar.

The problem of image selection from a large collection of unclassified photographs is particularly apparent in a photo kiosk system. The limited available input devices (e.g., touch screen only), as well as a lack of permanent storage in kiosk systems, make the searching and selection of desired images from a large collection of unclassified digital photographs more difficult. Manually searching through the collection of photographs is made more time consuming as a result of constraints relating to user interaction with the system. Furthermore, the lack of permanent storage generally prevents permanent records, such as indexed databases, to be generated and/or maintained in order to aid the search process. A situation where this problem becomes apparent occurs, for example, when a user takes a large number of digital photographs to a photo kiosk over a prolonged period of time and then wishes to create photographic merchandise. The user would typically search for photographs containing certain persons of interest, such as friends or family members. This would be a very time consuming process as manual searching of the photograph collection would take a long time and would be exacerbated by the limited modes of user input to the photo kiosk system. This has a negative impact as the kiosk provider (retailer) has an interest in reducing the amount of time each user spends at the kiosk creating an order, thus increasing the number of users that can use the kiosk in a given period of time to increase turnover. Users may also be discouraged from using a photo kiosk if the process of creating an order is inconveniently long.

Several attempts have been made to overcome this problem. A method disclosed in U.S. Patent Publication No. 20070177805, filed on 27 Jan. 2008 and assigned to Eastman Kodak, enables a user to select persons of interest from a large collection of photographs. The system then performs a person detection algorithm on each photograph in the large collection of photographs in order to identify all photographs that include an instance of the selected person. This method disadvantageously requires the user to perform an extensive manual search of the large unclassified image collection in order to select persons of interest. The process is thus still very time consuming and generally only provides a marginal improvement when compared to a completely manual searching technique.

Another method disclosed in U.S. Pat. No. 7,286,723, filed on 23 Oct. 2007 and assigned to Hewlett Packard, relates to an automated searching algorithm which searches a large collection of unclassified photographs by first analysing each image in the collection of photographs and identifying faces and/or particular scenes in the photographs. The algorithm then compares the detected faces and/or scenes to an indexed database of images containing annotated faces and/or images, in order to extract images containing instances of faces contained in the indexed database. This method is disadvantageous in that its implementation requires a persistent indexed database of facial images, which is generally not possible in a kiosk environment.

A need thus exists for improved methods and systems that substantially overcome or at least ameliorate disadvantages associated with existing arrangements.

SUMMARY

An aspect of the present invention provides a method for selecting one or more images from a plurality of captured images. The method comprises the steps of: analysing the plurality of captured images to recognise faces in the captured images using a facial recognition process; updating a count variable relating to a unique face each time the face is recognised in the captured images; selecting one or more unique faces when the related count variable satisfies a predetermined condition; and selecting a reduced number of the images which together include at least one instance of each of the selected faces.

The predetermined condition may comprise a minimum number of images that a face must be present in relative to the total number of the plurality of images.

The reduced number of images may comprise a minimal number of images which together include at least one instance of each of the selected faces.

The method may comprise the further step of grouping the plurality of captured images into one or more event sets based on at least temporal and/or geographical data relating to capture of each of the images.

The step of selecting a reduced number of images may comprise selecting from each event set, a minimum number of images which together include at least one instance of each of the selected faces existing in the event set.

Another aspect of the present invention provides a method for selecting one or more images from a plurality of captured images. The method comprises the steps of: analysing the plurality of captured images so as to recognise faces in the captured images using a facial recognition process; updating a count variable relating to a uniquely recognised face each time the face is recognised in the captured images; selecting one or more unique faces when the related count variable satisfies a predetermined condition; grouping the plurality of captured images into one or more event sets based on at least one or more of the date and location of capture of each of the captured images; and selecting from each event set, a reduced number of images which together include at least one instance of each of the selected faces existing in the event set.

Another aspect of the present invention provides a computer system for selecting one or more images from a plurality of captured images. The computer system comprises: memory for storing data and program instructions; a video display for displaying information to a user; and a processor coupled to the memory and the video display. The computer system is programmed to: analyse the plurality of captured images to recognise faces in the captured images using a facial recognition process; update a count variable relating to a unique face each time the face is recognised in the captured images; select one or more unique faces when the related count variable satisfies a predetermined condition; and select a reduced number of the images which together include at least one instance of each of the selected faces.

Another aspect of the present invention provides a computer system for selecting one or more images from a plurality of captured images. The computer system comprises: memory for storing data and program instructions; a video display for displaying information to a user; and a processor coupled to the memory and the video display. The computer system is programmed to: analyse the plurality of captured images so as to recognise faces in the captured images using a facial recognition process; update a count variable relating to a uniquely recognised face each time the face is recognised in the captured images; select one or more unique faces when the related count variable satisfies a predetermined condition; group the plurality of captured images into one or more event sets based on at least one or more of the date and location of capture of each of the captured images; and select from each event set, a reduced number of images which together include at least one instance of each of the selected faces existing in the event set.

Another aspect of the present invention provides a computer program product comprising a computer readable medium comprising a computer program recorded therein for selecting one or more images from a plurality of captured images. The computer program product comprises: computer program code means for analysing the plurality of captured images to recognise faces in the captured images using a facial recognition process; computer program code means for updating a count variable relating to a unique face each time the face is recognised in the captured images; computer program code means for selecting one or more unique faces when the related count variable satisfies a predetermined condition; and computer program code means for selecting a reduced number of the images which together include at least one instance of each of the selected faces.

Another aspect of the present invention provides a computer program product comprising a computer readable medium comprising a computer program recorded therein for selecting one or more images from a plurality of captured images. The computer program product comprises: computer program code means for analysing the plurality of captured images so as to recognise faces in the captured images using a facial recognition process; computer program code means for updating a count variable relating to a uniquely recognised face each time the face is recognised in the captured images; computer program code means for selecting one or more unique faces when the related count variable satisfies a predetermined condition; computer program code means for grouping the plurality of captured images into one or more event sets based on at least one or more of the date and location of capture of each of the captured images; and computer program code means for selecting from each event set, a reduced number of images which together include at least one instance of each of the selected faces existing in the event set.

BRIEF DESCRIPTION OF THE DRAWINGS

A small number of embodiments relating to a method and system for selecting one or more images from a plurality of captured images are described hereinafter with reference to the accompanying drawings, in which:

FIG. 9 is a table showing one possible data structure for use with temporary memory storage in embodiments of the present invention;

FIG. 17A is a table showing one possible data structure for use with geographic memory storage in embodiments of the present invention.

Figure 1A:
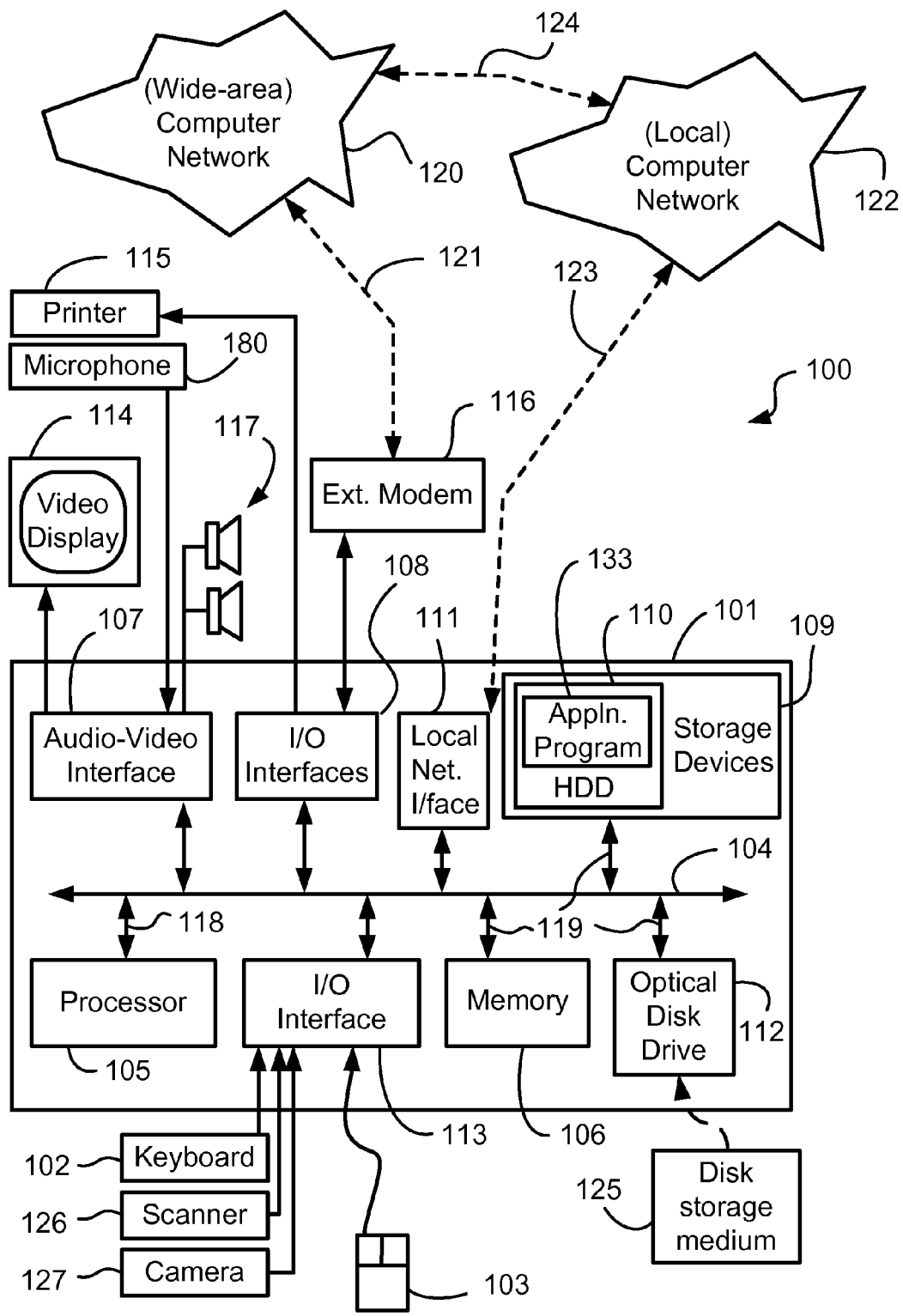
FIGS. 1A and 1B are schematic block diagrams of a general purpose computer system with which embodiments of the present invention can be practiced.

In the drawings, like references have been used throughout to designate identical or substantially equivalent elements, steps or features.

DETAILED DESCRIPTION

Embodiments of the present invention described hereinafter relate to methods and systems for selecting images from a collection of captured images using facial recognition. Certain of the embodiments described hereinafter additionally use temporal metadata and/or geographic metadata in order to automatically group images for presenting to a user. Automatic grouping of images assists the user to quickly filter a large number of unclassified images to locate images of interest.

In the context of the present specification, captured images are intended to include any digital images captured with or by a digital device. An "image" thus includes a "photo" or "photograph" taken with a digital camera or scanned from an original document. Such images are composed of pixels, which are the smallest units displayed by computer monitors. Each pixel is assigned a tonal value (black, white, a shade of gray, or colour) and is stored in binary code (zeros and ones).

Figure 1B:
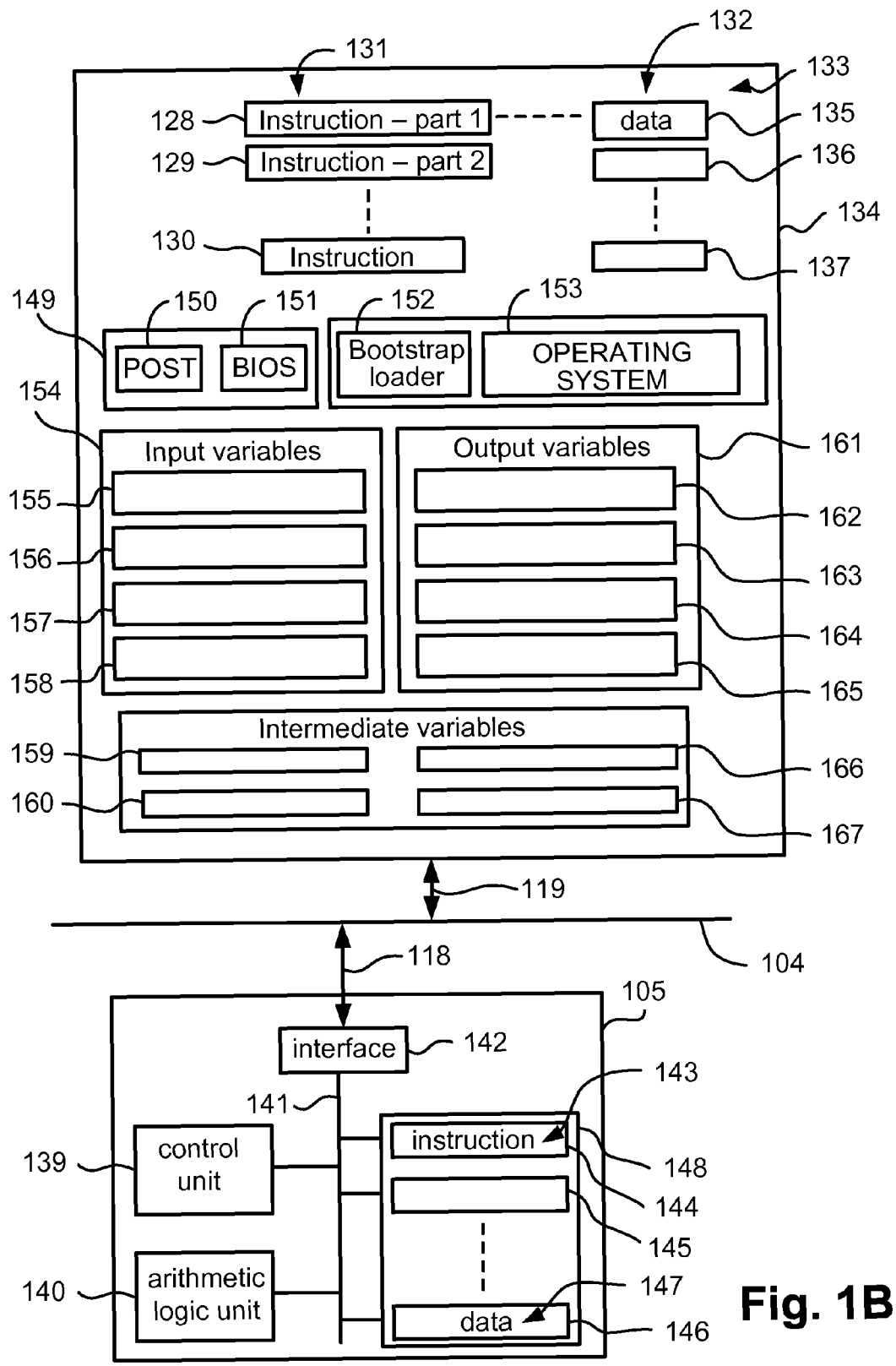

Embodiments of the present invention may be practised using a computer system 100, such as that illustrated in FIGS. 1A and 1B of the accompanying drawings.

FIGS. 1A and 1B collectively form a schematic block diagram of a general purpose computer system 100, with which embodiments of the present invention can be practiced. Specifically, the computer system 100 may be programmed to perform the steps of the methods described herein.

As seen in FIG. 1A, the computer system 100 is formed by a computer module 101, input devices such as a keyboard 102, a mouse pointer device 103, a scanner 126, a camera 127, and a microphone 180, and output devices including a printer 115, a display device 114 and loudspeakers 117. An external Modulator-Demodulator (Modem) transceiver device 116 may be used by the computer module 101 for communicating to and from a communications network 120 via a connection 121. The network 120 may be a wide-area network (WAN), such as the Internet or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the network 120.

The computer module 101 typically includes at least one processor 105 and a memory 106, for example, formed from semiconductor random access memory (RAM) and semiconductor read only memory (ROM). The at least one processor 105 may comprise multiple processors, for example, arranged in a pipelined or parallel configuration. The module 101 also includes an number of input/output (I/O) interfaces including an audio-video interface 107 that couples to the video display 114, loudspeakers 117 and microphone 180, an I/O interface 113 for the keyboard 102, mouse 103, scanner 126, camera 127 and optionally a joystick (not illustrated), and an interface 108 for the external modem 116 and printer 115. In some implementations, the modem 116 may be incorporated within the computer module 101, for example within the interface 108. The computer module 101 also has a local network interface 111 which, via a connection 123, permits coupling of the computer system 100 to a local computer network 122, known as a Local Area Network (LAN). As also illustrated, the local network 122 may also couple to the wide network 120 via a connection 124, which would typically include a so-called "firewall" device or device of similar functionality. The interface 111 may be formed by an Ethernet™ circuit card, a Bluetooth™ wireless arrangement or an IEEE 802.11 wireless arrangement.

The interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD), USB-RAM, and floppy disks for example may then be used as appropriate sources of data to the system 100.

The components 105 to 113 of the computer module 101 typically communicate via an interconnected bus 104 and in a manner which results in a conventional mode of operation of the computer system 100 known to those skilled in the relevant art. Examples of computers on which the described arrangements or embodiments can be practised include IBM-PC's and compatibles, Sun Sparcstations, Apple Mac™ or similar computer systems.

The methods or processes described hereinafter (e.g., with reference to FIGS. 3 to 8, 10, 13 15 and 16) may be implemented as software, such as one or more application programs 133 executable within the computer system 100. In particular, the steps of the methods or processes described hereinafter may be implemented as programmed instructions 131 in the software 133 that are executed by the computer system 100. The software instructions 131 may be formed as one or more code modules, each for performing one or more particular tasks. The software may also be divided into two separate parts, in which a first part and the corresponding code modules performs the methods described hereinafter and a second part and the corresponding code modules manage a user interface between the first part and the user (e.g., as shown in FIGS. 11, 12 and 14).

The software 133 is generally loaded into the computer system 100 from a computer readable medium (the software 133 and computer readable medium together form a computer program product), and is then typically stored in the HDD 110, as illustrated in FIG. 1A, or the memory 106, after which the software 133 can be executed by the computer system 100. In some instances, the application programs 133 may be supplied to the user encoded on one or more CD-ROM 125 and read via the corresponding drive 112 prior to storage in the memory 110 or 106. Alternatively the software 133 may be read by the computer system 100 from the networks 120 or 122 or loaded into the computer system 100 from other computer readable media. A computer readable storage media refers to any storage medium that participates in providing instructions and/or data to the computer system 100 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external to the computer module 101. Examples of computer readable transmission media that may also participate in the provision of software, application programs, instructions and/or data to the computer module 101 include radio or infra-red transmission channels as well as a network connection to another computer or networked device, and the Internet or Intranets including email transmissions and information recorded on Websites and the like.

Figure 11:
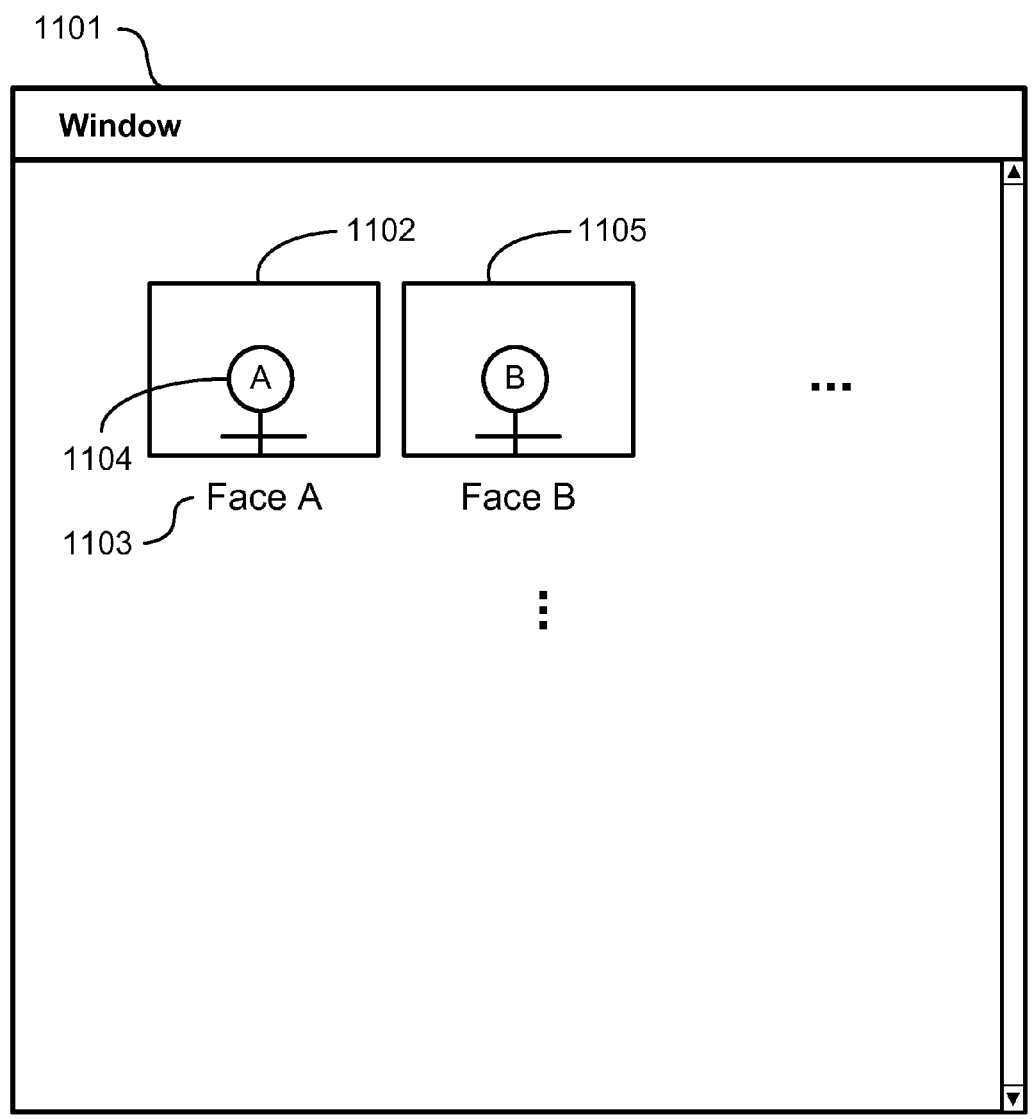
FIG. 11 is a computer screen display showing a window which enables a user to select a group of images based on a face or person of interest.
Figure 12:
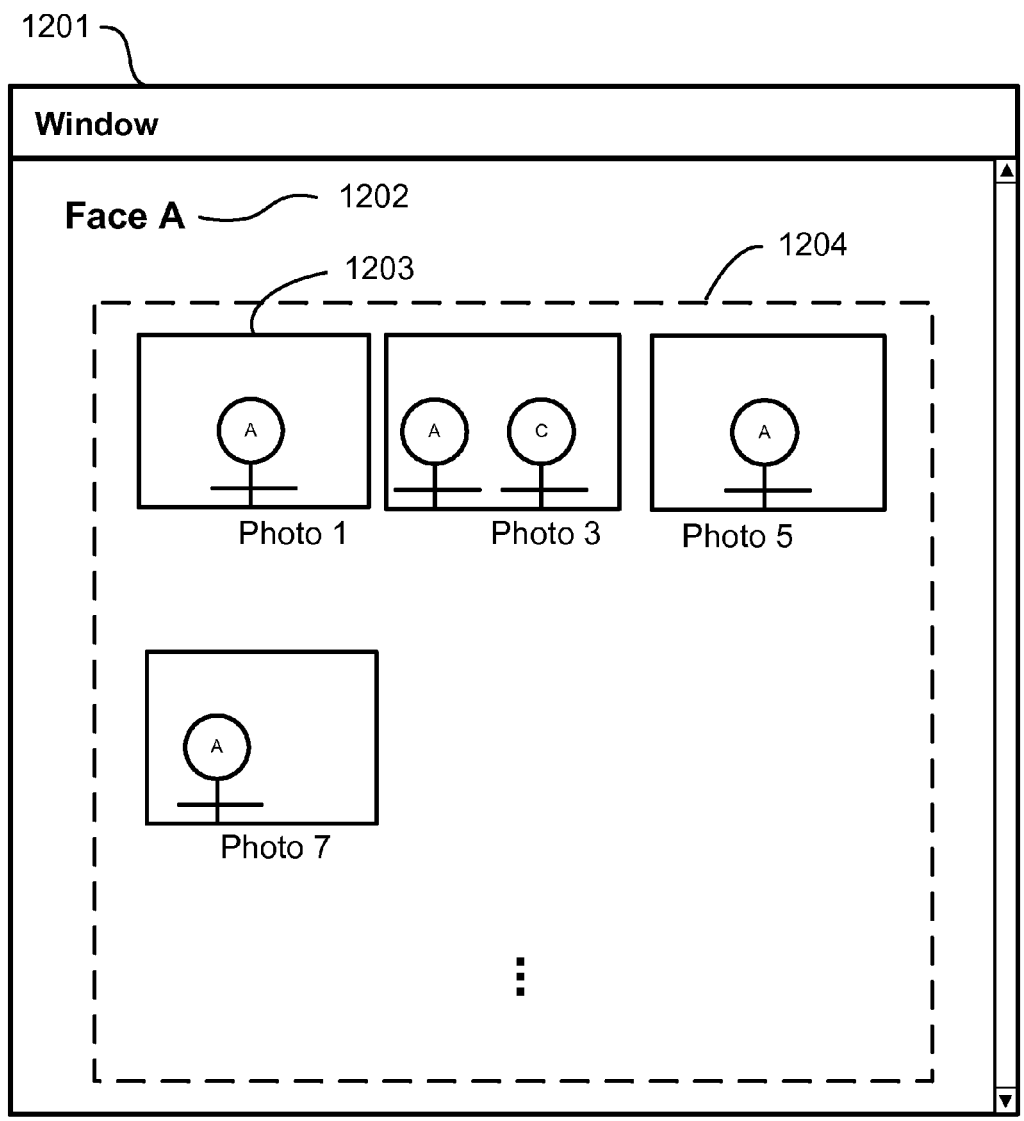
FIG. 12 is a computer screen display showing a window which enables a user to view all the images within a particular image group.
Figure 14:
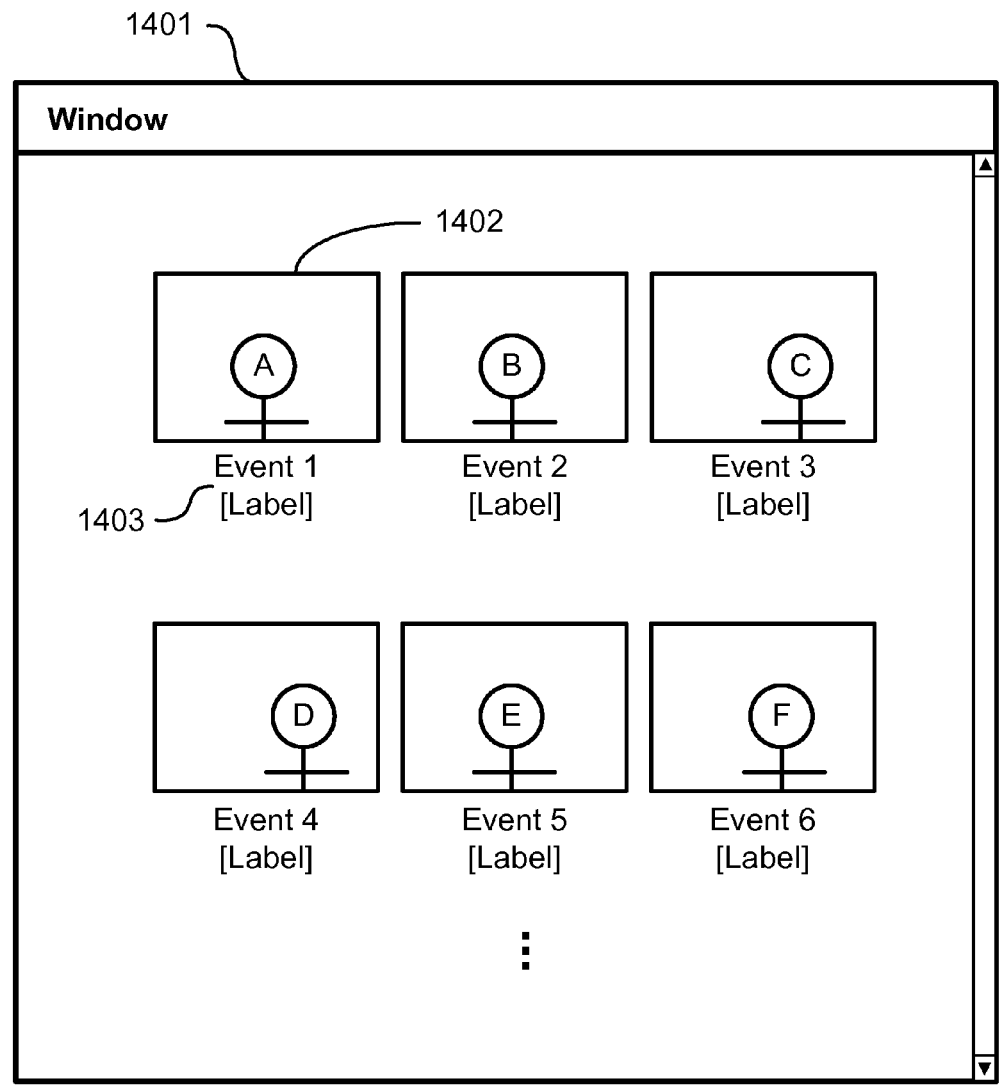
FIG. 14 is a computer screen display showing a window which enables a user to select a group of images based on an event of interest.

The second part of the application programs 133 and the corresponding code modules mentioned above may be executed to implement one or more graphical user interfaces (GUIs) to be rendered or otherwise represented upon the display 114 (e.g., as shown in FIGS. 11, 12 and 14). Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the at least one processor 105 and a "memory" 134. While only a single processor is shown in FIGS. 1A and 1B, those skilled in the art will appreciate that multiple processors or processor cores are used to practise embodiments of the present invention. The memory 134 represents a logical aggregation of all the memory devices (including the HDD 110 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106. A program permanently stored in a hardware device such as the ROM 149 is sometimes referred to as firmware. The POST program 150 examines hardware within the computer module 101 to ensure proper functioning, and typically checks the processor 105, the memory (109, 106), and a basic input-output systems software (BIOS) module 151, also typically stored in the ROM 149, for correct operation. Once the POST program 150 has run successfully, the BIOS 151 activates the hard disk drive 110. Activation of the hard disk drive 110 causes a bootstrap loader program 152 that is resident on the hard disk drive 110 to execute via the processor 105. This loads an operating system 153 into the RAM memory 106 upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 109, 106 in order to ensure that each process or application running on the computer module 101 has sufficient memory in which to execute without colliding with memory allocated to another process. Furthermore, the different types of memory available in the system 100 must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

The processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal buses 141 functionally interconnect these functional modules. The processor 105 typically also has one or more interfaces 142 for communicating with external devices via the system bus 104, using a connection 118.

The application program 133 includes a sequence of instructions 131 that may include conditional branch and loop instructions. The program 133 may also include data 132 which is used in execution of the program 133. The instructions 131 and the data 132 are stored in memory locations 128-130 and 135-137 respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128-129.

In general, the processor 105 is given a set of instructions which are executed therein. The processor 105 then waits for a subsequent input, to which it reacts to by executing another set of instructions. Each input may be provided from one or more of a number of sources, including data generated by one or more of the input devices 102, 103, data received from an external source across one of the networks 120, 122, data retrieved from one of the storage devices 106, 109 or data retrieved from a storage medium 125 inserted into the corresponding reader 112. The execution of a set of the instructions may in some cases result in output of data. Execution may also involve storing data or variables to the memory 134.

The embodiments disclosed hereinafter may use input variables 154 that are stored in the memory 134 in corresponding memory locations 155-158. The embodiments disclosed hereinafter may produce output variables 161 that are stored in the memory 134 in corresponding memory locations 162-165. Intermediate variables may be stored in memory locations 159, 160, 166 and 167.

The register section 144-146, the arithmetic logic unit (ALU) 140, and the control unit 139 of the processor 105 work together to perform sequences of micro-operations needed to perform "fetch, decode, and execute" cycles for every instruction in the instruction set making up the program 133. Each fetch, decode, and execute cycle comprises:

(a) a fetch operation, which fetches or reads an instruction 131 from a memory location 128;

(b) a decode operation in which the control unit 139 determines which instruction has been fetched; and (c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the methods or processes described hereinafter is associated with one or more segments of the program 133, and is performed by the register section 144-147, the ALU 140, and the control unit 139 in the processor 105 working together to perform the fetch, decode, and execute cycles for every instruction in the instruction set for the noted segments of the program 133.

Figure 2:
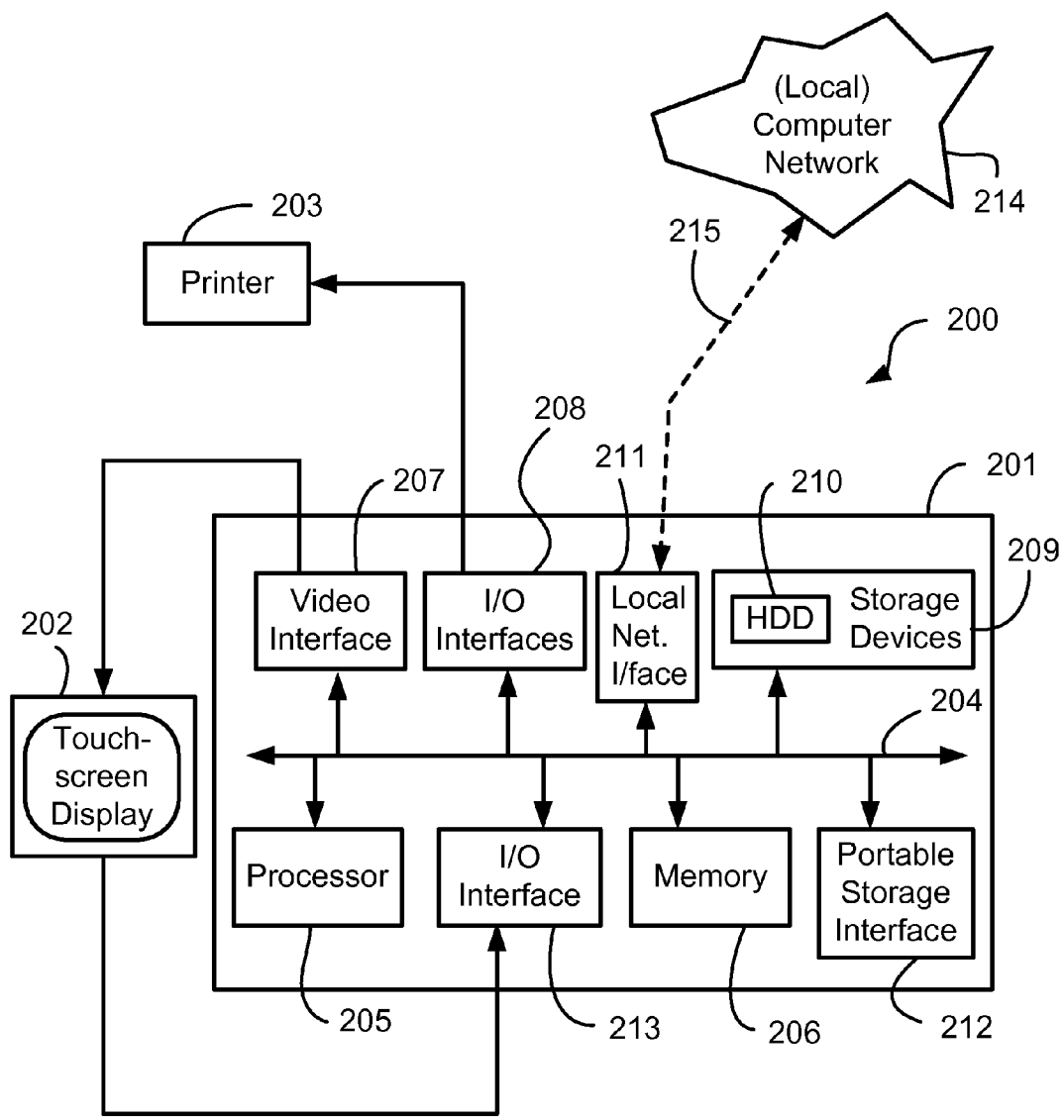
FIG. 2 is a schematic block diagram of a kiosk-specific computer system with which embodiments of the present invention can be practiced.

The embodiments described hereinafter are described with reference to a kiosk-specific computer system 200, as shown in FIG. 2. The kiosk-specific computer system 200 has a more constrained hardware setup compared to the more general purpose computer system 100 described hereinbefore with reference to FIG. 1. The kiosk-specific computer system 200 it is more suitable for a retail environment where the system is intended for use by a large number of different users who have no affiliation with the retail outlet.

The computer module 201 is substantially similar to the computer module 101 of the computer system 100 of FIG. 1 and contains I/O interfaces 208 and 213, at least one processor 205, memory 206, local network interface 211, storage devices 209 and hard disk drive 210. The kiosk-specific computer module 201, however, differs from the general computer module 101 in that, while it contains a video interface 207, no audio interface is provided as audio output is not required. Furthermore, a portable storage interface 212 is provided to enable various types of portable media to be read by the kiosk-specific computer system 200, such as Secure Digital cards, Compact Flash cards, Memory Stick PRO cards, as well as more conventional optical media.

The kiosk-specific computer system 200 comprises a touch-screen display 202 which acts as a user input device. Furthermore, output devices provided include a printer 203 and the touch-screen display 202. The kiosk-specific computer system 200 also comprises a local network interface 211 which connects to a local area network (LAN) 214 via a connection 215. The kiosk-specific computer system 200 does not generally require a connection to a wide area network (WAN) such as the Internet, and as a result does not comprise an external modem 116 like the computer system 100.

Kiosk specific computer systems such as the computer system 200 are distinct from more general computer systems such as the computer system 100 of FIG. 1 in that a kiosk specific computer system enables user interaction with the computer system 200 via a touch screen 202. That is, a keyboard and/or mouse such as the keyboard 102 and mouse 103 of the computer system 100 are not provided as input devices. Furthermore, the kiosk specific computer system 200 is designed for single use by multiple users and, as a consequence, no permanent data storage that forms part of the kiosk specific computer system is provided for users. Users may generally only store data on portable media which may be coupled to the kiosk specific computer system 200 for reading and/or writing data. This poses two significant constraints on kiosk specific computer systems when compared to more general purpose computer systems. Firstly, operations that require persistent data can generally not be executed. Secondly, operations which require complex user interaction are more time consuming, as the modes of input are limited to the touch-screen 202.

Figure 3:
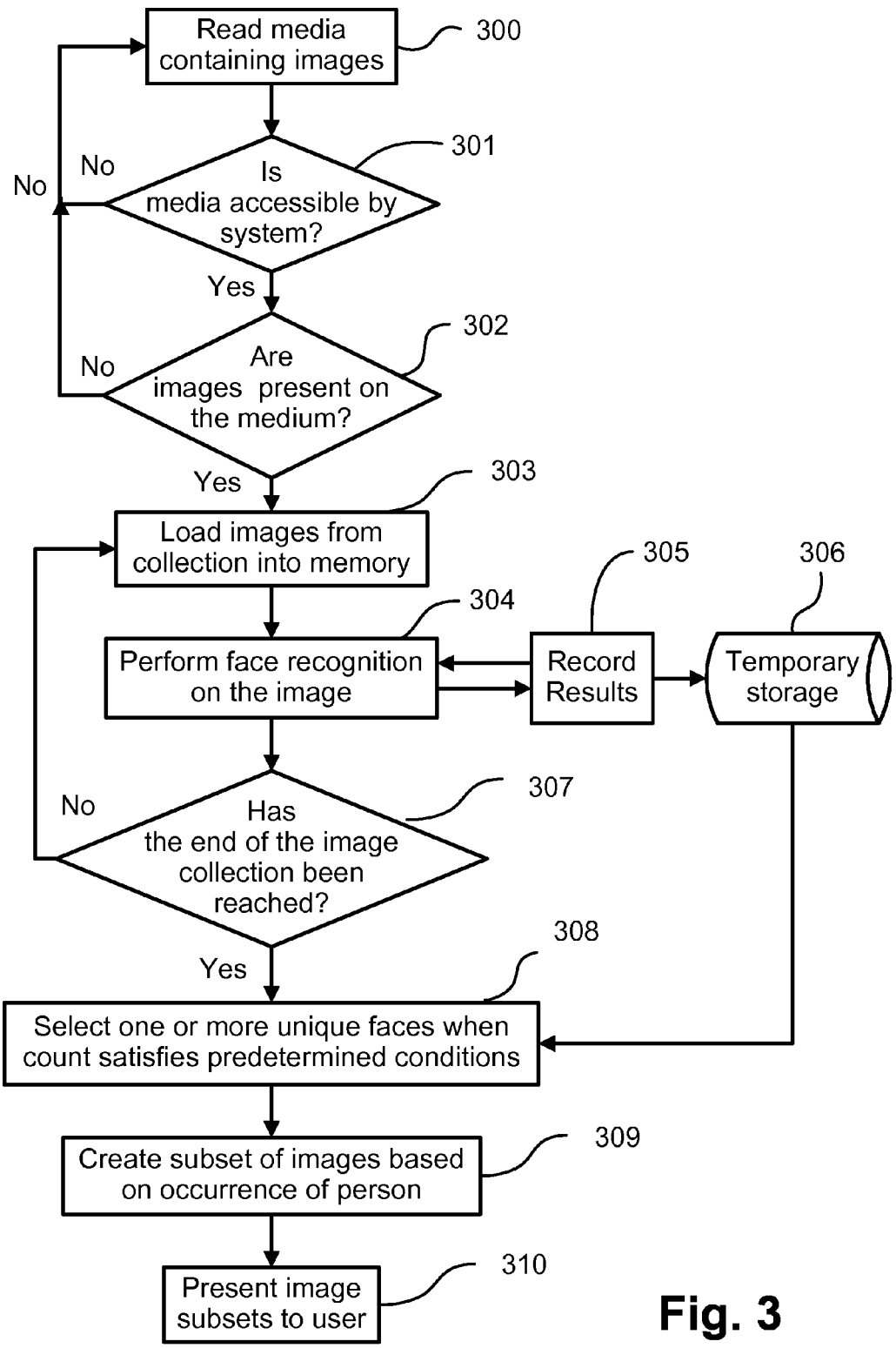
FIG. 3 is a flow diagram of a method for selecting one or more images from a plurality of captured images in accordance with an embodiment of the present invention.

FIG. 3 is a flow diagram of a method for selecting one or more images from a plurality of captured images in accordance with an embodiment of the present invention. The method of FIG. 3 is described with reference to a kiosk-specific computer system such as the kiosk-specific computer system 200 shown in FIG. 2. However, those skilled in the art will appreciate that the method of FIG. 3 is not limited to execution on a kiosk-specific computer system 200 and can be executed on any general purpose computer system such as the computer system 100 of FIGS. 1A and 1B, or a variation thereof.

Referring to FIG. 3, a plurality of captured images (e.g., a large collection of unclassified digital images) is analysed in steps 300 to 304 to recognise faces using a face recognition process.

Availability of the plurality of captured images for analysis may be verified. The computer system 200 first verifies that the media containing the plurality of captured images is accessible by the computer system 200 at steps 300 and 301. This is accomplished by the computer system 200 attempting to read the media at step 300. If the read is unsuccessful (No), at step 301, the computer system 200 repeats the attempt to read at step 300. If the read of the media is successful (Yes), the system loads the images or photographs from the collection into memory at step 303 for further processing. The number of images that are loaded into memory at step 303 for further processing is at least one, but can be greater depending on the hardware capabilities of the particular computer system 200.

After at least one image from the plurality of images has been loaded into memory at step 303, a face recognition algorithm is performed on the images at step 304 in order to analyse and determine; (a) whether one or more faces are present in the images and (b) to classify or recognise the faces detected in the captured images. Any known face recognition method or algorithm may be used to perform step 304. For example, that the face recognition method described in U.S. Pat. No. 7,403,636, which issued to Chen, et al. on Jul. 22, 2008 and has been assigned to the applicant of present application, may be used to perform step 304.

Face Recognition

A general face recognition process or method is described hereinafter with reference to FIG. 5, which includes steps 303 and 304 of FIG. 3.

Figure 5:
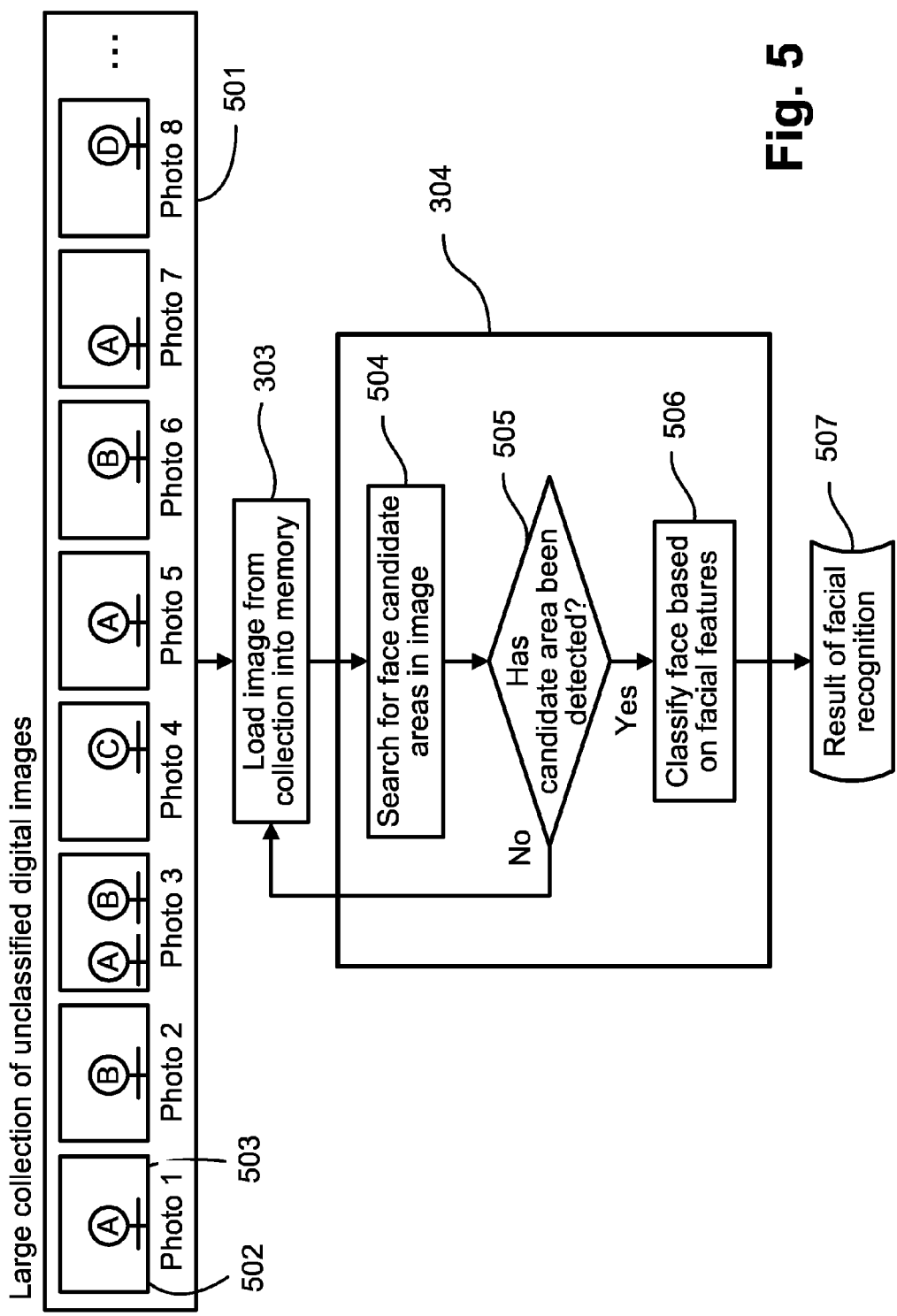
FIG. 5 is a flow diagram of a method for face recognition applied to a large collection of unclassified images in accordance with an embodiment of the present invention.

Referring to FIG. 5, an image from a collection of images 501 is loaded into memory at step 303. The face detection process of step 304 of FIG. 3 comprises steps 504 to 506 of FIG. 5. At step 504, the loaded image data is analysed or searched for areas of the image which are candidates for facial recognition (i.e., potential faces in the image). If candidate areas for facial recognition are detected at step 505 (Yes), the process then proceeds to classify each detected candidate area based on facial features at step 506. If no candidate areas for facial recognition are detected (No), the process returns to step 303 to load the next image from the collection into memory and then repeats the step 505. The detected candidate areas may be classified based on a number of facial features in step 506, however, the exact method may vary based on the particular implementation. The method described in U.S. Pat. No. 7,403,636 referred to hereinbefore, for example, classifies candidate areas based on features of the mouth. Thus, the classification method may make various measurements of the mouth area in a candidate area and output these for further processing. Other commonly used face recognition methods may measure other facial features, such as the eyes, nose, the relative position of facial features or skin tone. The result of facial recognition 507 is the output of step 304.

Updating a Count Related to Each Unique Face

Once the facial recognition process is completed for each image, the results thereof are recorded at step 305 by the kiosk specific computer system 200. This is accomplished by updating a count variable relating to each uniquely recognised face, each time the respective face is recognised in the captured images. Step 305 of FIG. 3 is described in more detail hereinafter with reference to FIG. 6. The input to step 305 is the result of the facial recognition 507 of FIG. 5.

Figure 6:
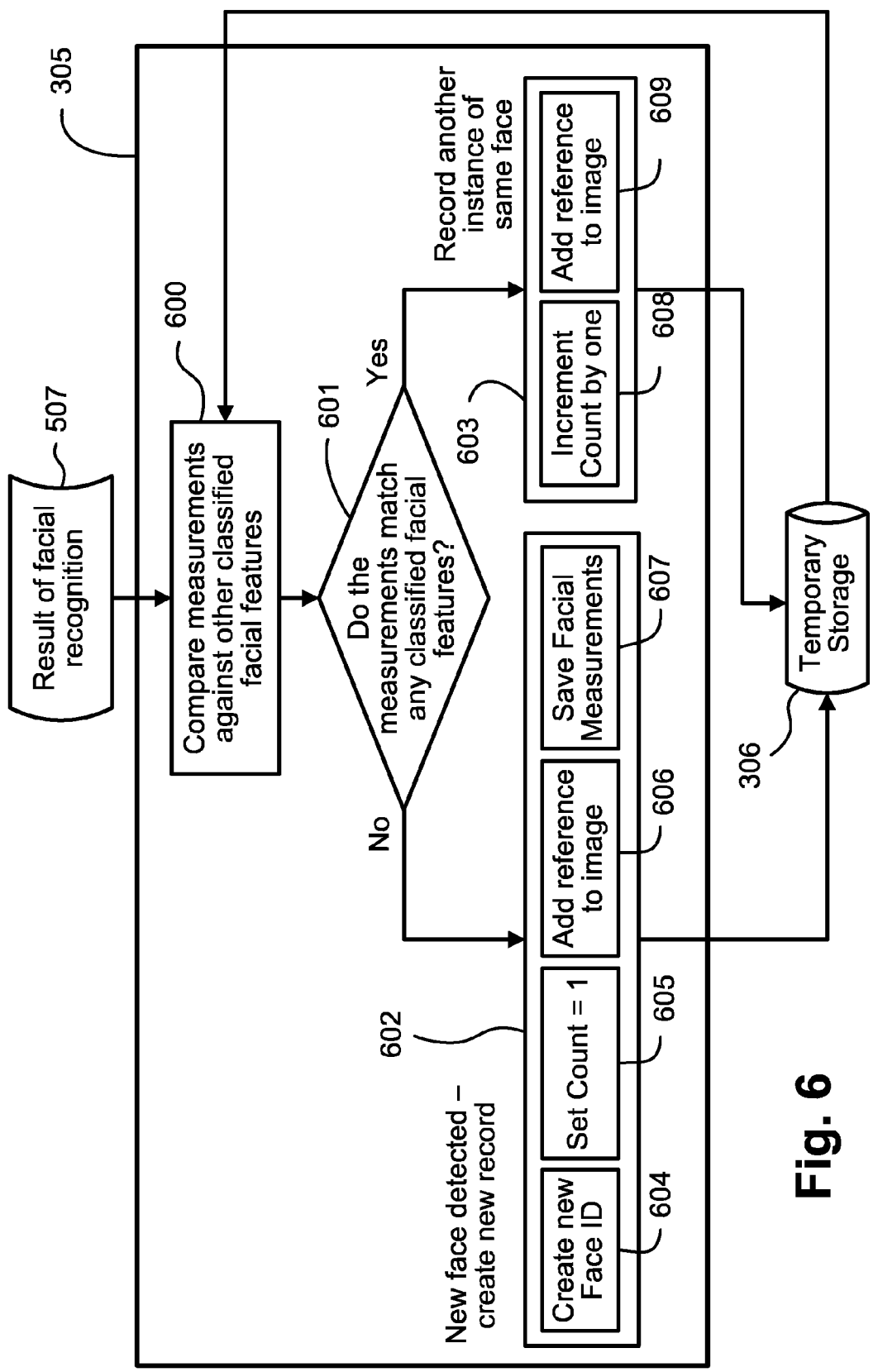
FIG. 6 is a flow diagram of a method for comparing analysed faces and storing the results of the comparison in accordance with an embodiment of the present invention.

Referring to FIG. 6, the measurements of all the candidate areas of the image under analysis are compared to already classified faces or facial measures at step 600. If a match occurs with an already classified face (Yes), at step 601, another instance of the face is recorded at step 603 in the temporary storage 306. Step 603 comprises the sub-steps of: incrementing a count variable representative of the number of instances of the same face (step 608), and adding a reference to the image (step 609).

If a match between the measurements of candidate areas of the image under analysis is not able to be made (No), at step 601, a new face has been detected and a new record is created at step 602 in the temporary storage 306. Step 602 comprises the sub-steps of: creating a new face ID (step 604), incrementing a counter representative of the number of identified faces (step 605), adding a reference to the image (step 606), and saving the facial measurements (step 607).

The temporary storage 306 can be implemented in a number of ways to suit a particular implementation or embodiment of the present invention. One implementation is to host the temporary storage 306 locally on the kiosk-specific computer system 200, either on the hard disk drive 210 or directly in memory 206 for faster access.

An example of a data structure for the temporary storage 306 is shown in FIG. 9. The data structure of FIG. 9 is a simple flat file database which stores the relevant information about the detected faces in the image collection. The example in FIG. 9 comprises the following categories of information:

Face ID 900—a category to store the unique identifier of a particular facial classification or a unique set of measurements of facial features.

Facial Measures 901—a category to store the specific facial measurement data for a particular Face ID. This is used in steps such as step 600 when comparing facial measurements in order to determine whether an instance of the same face has been detected.

Count 902—a category to store the number of times a particular face has been detected in the image collection.

Images 903—a category to store the list of images in which the face has been detected. This category will typically store a parameter which uniquely identifies the image, such as the file name, rather than the image itself.

The process of updating a count variable relating to each unique face each time the particular face is recognised in the captured images can be implemented in a number of ways to suit a particular implementation or embodiment. More particularly, the insertion of a new record at step 602 or the recording of another instance of an already classified face at step 603 may be tailored to suit a particular implementation. One implementation of these steps is described hereinafter, which represents an example and is not intended to limit the scope of the present invention.

Using the suggested structure of the temporary storage 306 in FIG. 9, a new record may be inserted into the temporary storage 306 at step 602 by carrying out the following sub-steps. Firstly, a new Face ID is created at step 604 in order to uniquely identify the detected face, which is stored in the Face ID field 900. The Face ID may be generated in a number of ways, such as ascending integers, a hash table, or according to another suitable method. The Count variable is set to one at step 605, as this is the first instance of a newly detected face, and is stored in the Count field 902. A reference to the image in which the face was detected is stored in the Images field 903 of the data structure of FIG. 9, at step 606. The data stored in the Images field 903 is dependent on the parameter used to uniquely identify images. If the file name parameter is used as the unique identifier, then the file name is added to the Images field 903 in order to associate the detected face with the image it was detected in. Finally, the result of the facial recognition 507 is stored in the Facial Measurement field 901 of the data structure of FIG. 9. Steps 604 to 607 serve to create a new record 904 which can then be used to compare against other facial measurements.

Using the same data structure of the temporary storage 306 as shown in FIG. 9, another instance of the same face can be recorded at step 603 by carrying out the following sub-steps. The record 904 with which the facial measurements are a match is selected and the Count field 902 is incremented by one at step 608 to show that another instance of the same face has been detected or recognised. Finally, a reference to the image in which the face was detected is stored in the Images field 903 of the data structure shown in FIG. 9, at step 609.

Selecting One or More Unique Faces

Returning now to FIG. 3, after the entire collection of images 501 has been analysed and the results stored in the temporary storage 306, one or more unique faces are selected at step 308 when the related Count variable satisfies one or more predetermined conditions. Step 308 determines which images contain faces of people in whom the user would likely have a high interest. This is because the more frequently a face occurs in an image collection, the more likely it is that the face or person is of greater interest to the user than people whose face occurs less frequently in the image collection. The actual method of selecting one or more unique faces at step 308 when the related Count variable satisfies one or more predetermined conditions can be implemented in a number of ways to suit a particular implementation or embodiment. One implementation of the method is described hereinafter, however, this is not intended to limit the scope of the present invention.

An implementation of a method for selection of one or more unique faces when the related Count variable satisfies one or more predetermined conditions (step 308 of FIG. 3) is described hereinafter with reference to FIG. 8. This particular implementation uses a threshold percentage 806 in order to determine which images in the collection of unclassified images contain faces of people that the user 801 may likely have a high interest in. The threshold percentage may, for example, specify that each unique face which appears in more than 10% of all photographs in the collection should be selected as a candidate for further processing. The predetermined condition/s could alternatively be implemented as a number of other measures, such as a count, a certain number of most commonly occurring faces, combinations thereof or any other suitable criterion. The threshold percentage 806 refers to the minimum percentage of images that a particular face must be present in, relative to the entire image collection, in order to be classified as an image containing persons of interest to the user.

Figure 8:
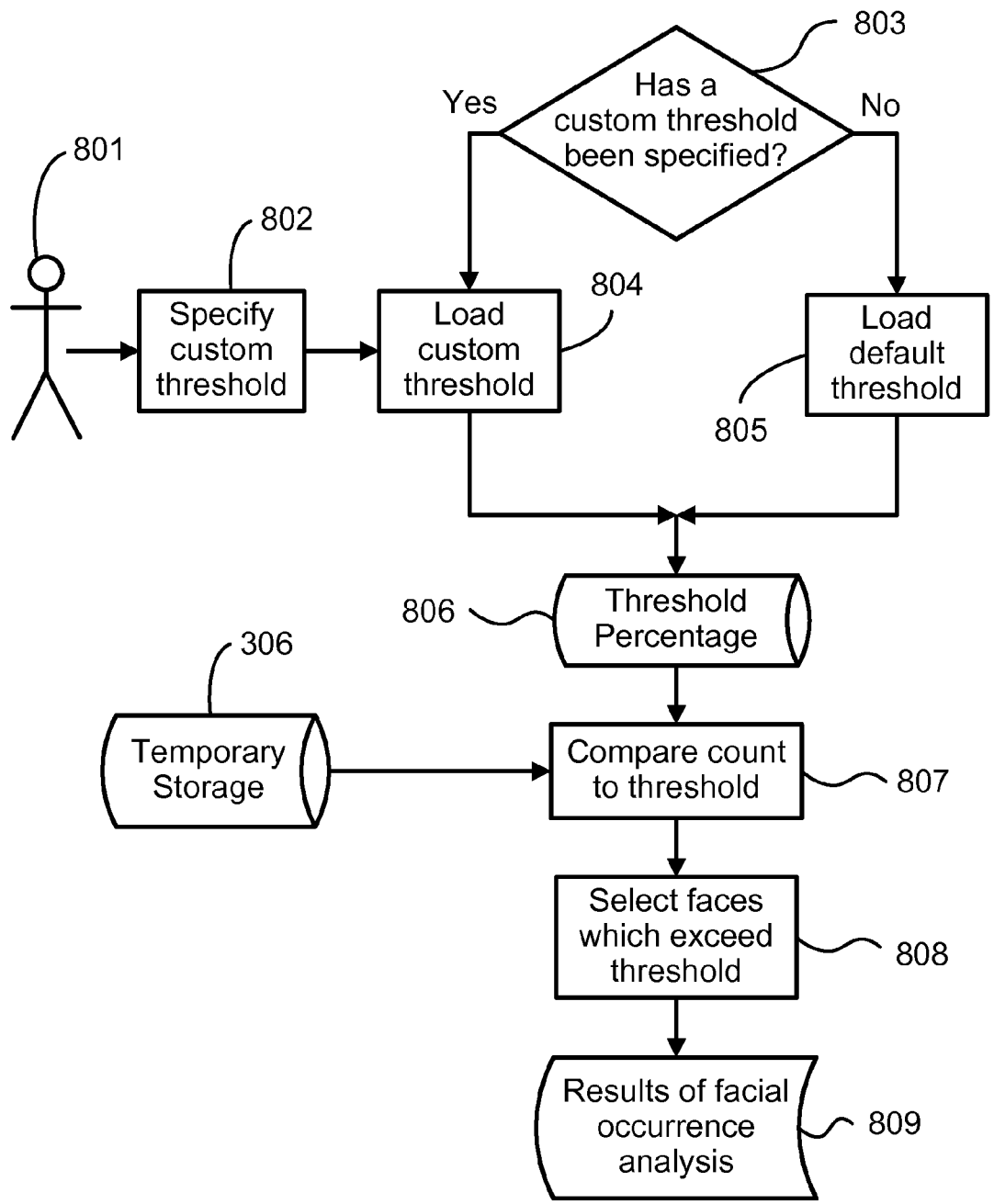
FIG. 8 is a flow diagram of a method for selecting one or more unique faces based on a predetermined threshold for facial occurrence in accordance with an embodiment of the present invention.

Referring to FIG. 8, the kiosk specific computer system 200 verifies whether a custom threshold percentage has been specified by the user 801 at step 803. If a custom threshold has not been specified (No), the system loads a default threshold percentage as the threshold percentage 806 at step 805. The user 801 has the option to specify a custom threshold at step 802, which is loaded as the threshold percentage 806 at step 804. At step 807, the threshold percentage 806 is used to evaluate each unique face identified in the image collection based on the related count 902 stored in the temporary storage 306. The unique faces having a count 902 which exceeds the threshold percentage are selected as candidates for output at step 808. The output of the method of FIG. 8 is a record 809 of the unique faces and associated images which exceed the threshold percentage.

Figure 10:
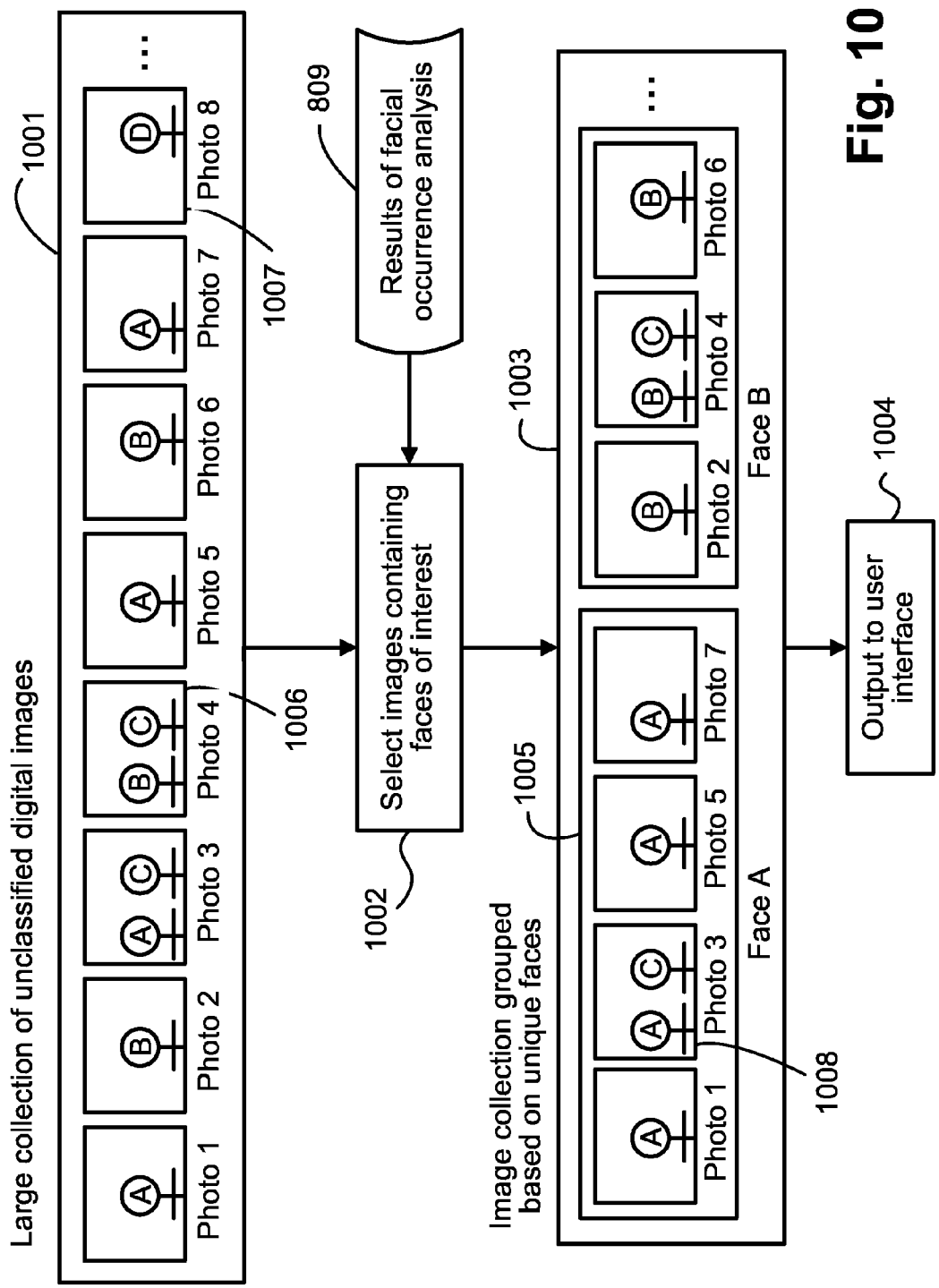
FIG. 10 is a flow diagram of a method for selecting images from a collection of images based on unique faces which satisfy a minimum occurrence threshold in accordance with an embodiment of the present invention.

FIG. 10 illustrates an example of the image selection process of step 309 of FIG. 3. Referring to FIG. 10, the collection of unclassified images 1001 comprises a total of eight images. The images include four unique faces in total, labelled A, B, C and D. In the image collection 1001, face A occurs in 4 images (i.e., in 50% of the images in the image collection 1001), face B occurs in 3 images (i.e., in 37.5% of the images in the image collection 1001), face C occurs in 2 images (i.e., in 25% of the images in the image collection 1001) and face D occurs in 1 image (i.e., in 12.5% of the images in the image collection 1001). Thus, if in this example the threshold percentage was set at 30%, images including face A and/or face B (i.e., all images except the image 1007, which includes only face D) would be selected as images including faces of interest to the user 1003, as only faces A and B occur in a number of images which exceeds the threshold value of 30%. The images selected at step 1002 are selected using the results of facial occurrence analysis 809 generated in FIG. 8. The collection of selected images 1003 are outputted at step 1004 for further processing or for display by a user interface of the kiosk specific computer system 200.

Selecting a Reduced or Minimum Number of Images to Present to the User

Returning to FIG. 3, a reduced number of images which together include at least one instance of each of the selected faces is selected from the collection of images that include faces of interest to the user 1003 at step 309. The reduced number of images may comprise a minimum number of images which together include at least one instance of each of the selected faces. The exact method in which the reduced or minimum number of images is presented to the user is implementation specific and depends, for example, on the user interface used, the workflow of the application and criteria used to select relevant images. An implementation of a method for selecting a minimum number of images to present to the user is described hereinafter, however, this implementation is not intended to limit the scope of the present invention.

An implementation of a method for selecting of a minimum number of images to present to the user is described hereinafter with reference to FIG. 15.

Figure 15:
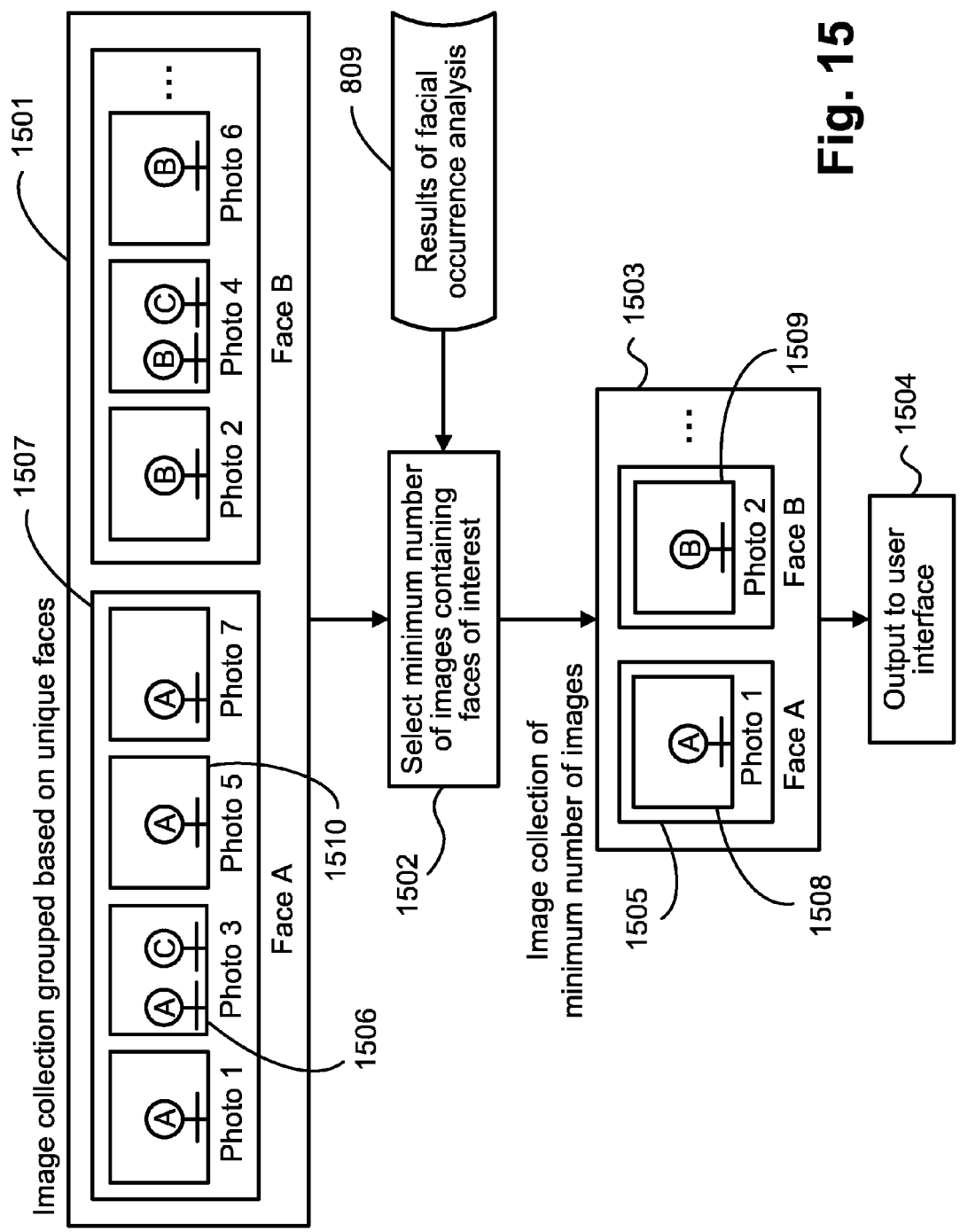
FIG. 15 is a flow diagram of a method for creating a subset of images in accordance with an embodiment of the present invention.

Referring to FIG. 15, the result of the facial occurrence analysis 809 as described hereinbefore with reference to FIG. 8, is used to select a minimum number of images 1503 at step 1502 from the identified image collection 1501. The selection of images containing faces judged to be of interest to the user, which is output at step 1004 of FIG. 10, is used as the input 1501 in the method of FIG. 15 for selecting a minimum number of images 1503 to present to the user.

FIG. 15 illustrates an example of a method for selecting a minimum number of images 1503 from an image collection grouped based on unique faces 1501 for presenting to the user. As stated hereinbefore with reference to the example in FIG. 10, face A and face B were identified as of interest to the user and thus all images containing instances of faces A and B were grouped into the image sets (e.g., image set 1507) in the image collection 1501. A minimum number of images 1503 is then selected from the groups of images in the image collection 1501 at step 1502, based on the results of facial occurrence analysis 809 generated in FIG. 8. In the example shown in FIG. 15, it can be seen that Photo 1, Photo 3, Photo 5 and Photo 7 are all possible candidates for selection as the minimum number of images 1505 representing the group of images containing face A 1507. Similarly, Photo 2, Photo 4 and Photo 6 are all possible candidates for selection as the minimum number of images representing the group of images containing face B. For this example, the simplest method for minimum image selection is that a single image 1508 is selected from each group of images 1507 at random. Thus, Photo 1 1508 is selected to represent the group of images 1507 containing face A. Similarly, Photo 2 1509 is selected to represent the group of images containing face B.

Selection of the image 1508 to be included in the final image collection 1503 is implementation specific and can be carried out in a number of ways to suit a particular implementation or embodiment. Some possibilities include, but are not limited to: selecting the image at random from the identified subset of images, selecting the image based on image quality (brightness, focus, etc.), and selecting an image which contains the most unique faces in a single image. Furthermore, a single image need not be selected for each unique face identified in the analysis 809 as, if one image contains multiple unique faces identified as important to the user, that image could be used. For example, Photo 1 1508 and Photo 2 1509 in the final image collection 1503 could be replaced with an image which includes both face A and face B. Similarly, it is not necessary to select a single image to represent an image group 1507. Any number of images may be selected to be included in the final minimum set of images 1505.

Referring to FIG. 15, it can be seen that the selection step 1502 reduces the original image collection 1501 significantly by eliminating images which do not contain faces of people who are likely to be of interest to the user (e.g., image 1007 in FIG. 10 is eliminated). Furthermore, the step 1502 eliminates all but a minimum number of images 1503 that includes faces likely to be of interest to the user. As a result, the final image collection 1503 is much more targeted towards the images that the user is likely to be interested in as the final image collection 1503 comprises a smaller subset of images compared to the original image collection 1001 and groups the relevant images together. This enables the user to search through the grouped image collection 1503 and select images of interest much more quickly. This makes the method effective for reducing the time required to select appropriate images and create desired merchandise items. The method is particularly effective for kiosk environments on account of being largely automated and requiring minimum user interaction with the kiosk system.

Once the image collection has been reduced based on unique faces likely to be of interest to the user 1503, the output is made available to the user via a user interface at step 1504. An example of a user interface suitable for displaying the grouped images 309 comprising unique faces relevant to the user is shown in FIG. 11. In this example, each image (such as the images 1102 and 1105) from the reduced image collection 1503 is simply displayed as a list inside a window 1101. A label 1103 may also be added to help the user distinguish each image 1102.

An alternative embodiment for creating a minimum subset of images based on the occurrence of a face at step 309 of FIG. 3 is now described with reference to FIG. 10. Referring to FIG. 10, the result of the facial occurrence analysis 809, as described hereinbefore with reference to FIG. 8, is used to select relevant images at step 1002 from the image collection 1001. In this instance, selection is carried out by simply selecting all images from the image collection 1001 in which a unique face appears which is above the threshold percentage. Images in which each unique face appears are identified and selected from the image collection 1001 based on the result of facial occurrence analysis 809 at step 1002. The images are grouped based on the unique faces (or combination thereof) 1005 in the image collection 1003.

It can be seen from FIG. 10 that the selection step 1002 reduces the original image collection 1001 significantly by eliminating images which do not contain faces of people who are likely to be of interest to the user (for example, image 1007 in FIG. 10 is eliminated). Furthermore, the selection step 1002 sorts the collection of images into groups of images (such as the group of images 1005) that contain a common face likely to be of interest to the user. As a result, the grouped image collection 1003 is much more targeted towards images that the user is likely to be interested in as the grouped image collection 1003 comprises a smaller subset of images compared to the original image collection 1001 and groups the related images together. This enables the user to search through the grouped image collection 1003 and select images of interest much more quickly. This makes the method effective for reducing the time required to select appropriate images and place an order. The method is particularly effective for kiosk environments on account of being largely automated and requiring minimal user interaction with the kiosk specific computer system 200.

Once grouped based on unique faces likely to be of interest to the user, the image collection 1003 is output or made available to the user via a user interface at step 1004. One example of a user interface suitable for displaying the grouped images containing unique faces relevant to the user, as generated or created at step 309 of FIG. 3 is shown in FIG. 11.

Following on from the example described in FIG. 15, Photo 1 1508 and Photo 2 1509 are selected to represent face A and face B, respectively. These photos (images) are used to represent the respective groups of images 1505. For example, Photo 1 1102 represents the group of images 1505 containing face A. Furthermore, in FIG. 11, each group of unique faces is labelled in order to help the user distinguish between the different groups of images. For example, the label 1103 is used to denote the face contained in the image or photo 1102.

In FIG. 11, the images are grouped based on each unique face occurring in images 1102 and 1105, and a single image is displayed to represent each group of images. However, the image groups may be represented in a number of other ways in the user interface, for example: displaying more than one image to represent each group or using images in which multiple unique faces appear, such as the image 1008 in FIG. 10, to represent multiple groups of images, such as the groups of images 1102 and 1105 in FIG. 11.

The user may select to view greater detail of a group of images containing a particular face by clicking on the image representing a group of images 1102 or the name of the group 1103, in the group selection window 1101. The detailed view window 1201 is displayed when the user selects a group of images to view. The window 1201 displays all the images (e.g., image 1203) pertaining to the particular group of images 1204. In the example in FIG. 12, face A 1104 is selected for more detailed viewing in the window 1101 in FIG. 11. The individual images (e.g., image 1203) pertaining to the group of images 1204 are displayed in a new window 1201, which is depicted in FIG. 12.

The window 1201 is labelled using the label 1202 assigned for the particular group of images in the previous window 1101. The user interface in FIG. 12 displays all images (e.g., image 1203) pertaining to a group of images 1204 simultaneously. However, the user interface may be implemented in a number of other ways, such as displaying only a small subset of images pertaining to the group of images and then enabling the user to dynamically expand the group to progressively include more images. The images contained in the dynamically expanded subset of images may further be selected based on other factors, such as the number of unique people in the image, image quality (brightness, focus, etc.), etc.

Sorting the Image Collection Based on Temporal and/or Geographic Characteristics Another embodiment of the present invention is described hereinafter with reference to FIG. 4.

Figure 4:
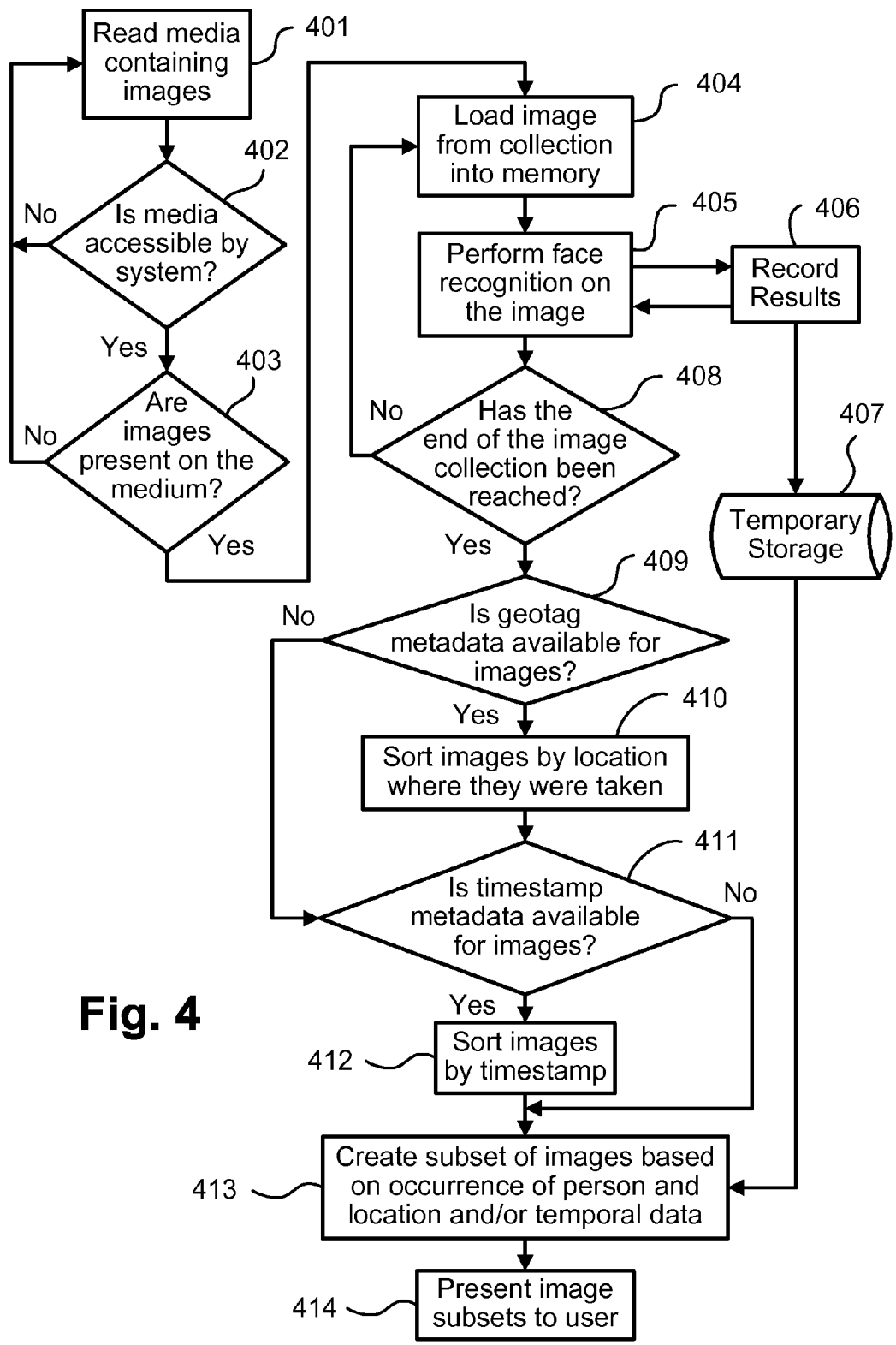
FIG. 4 is a flow diagram of a method for selecting one or more images from a plurality of captured images in accordance with another embodiment of the present invention.

Referring to FIG. 4, steps 401 to 408 and 414 are identical to steps 300 to 307 and 310 of FIG. 3, which relates to an embodiment described hereinbefore. The additional steps in the embodiment described with reference to FIG. 4, when compared to the embodiment described hereinbefore with reference to FIG. 3, comprise steps 409 to 413.

Images are loaded at steps 401 to 404 from the image collection and facial recognition is performed at steps 405 to 408 in much the same way as described hereinbefore with reference to steps 300 to 307 of FIG. 3. However, after completion of facial recognition in the embodiment of FIG. 4, the plurality of captured images is grouped into one or more event sets based on at least temporal and/or geographic data or characteristics relating to capture of the images. Temporal characteristics include the data and/or time of capture of the images and geographic characteristics include the location at which the images were captured. The embodiment of FIG. 4, in addition to classifying images in the collection based on facial recognition performed at step 405, further sorts the image collection based on temporal or geographic characteristics at steps 411 to 412 or steps 409 to 410, respectively. The image collection may be sorted based on temporal or geographic characteristics using a number of methods. One example of such a method is described hereinafter. However, other methods could be used to suit the particular implementation and the method described hereinafter is not intended to limit the scope of the present invention.

After facial recognition analysis has been performed at steps 404, 405 and 408, the kiosk specific computer system 200 checks whether geo-tag metadata (e.g., capture location data) is available for each particular image at step 409. If geo-tag metadata is available for images (Yes), the images are sorted based on the location/s where the images were captured at step 410. If geo-tag metadata is not available for the image (No), processing proceeds directly to step 411 from step 409.

Figure 7:
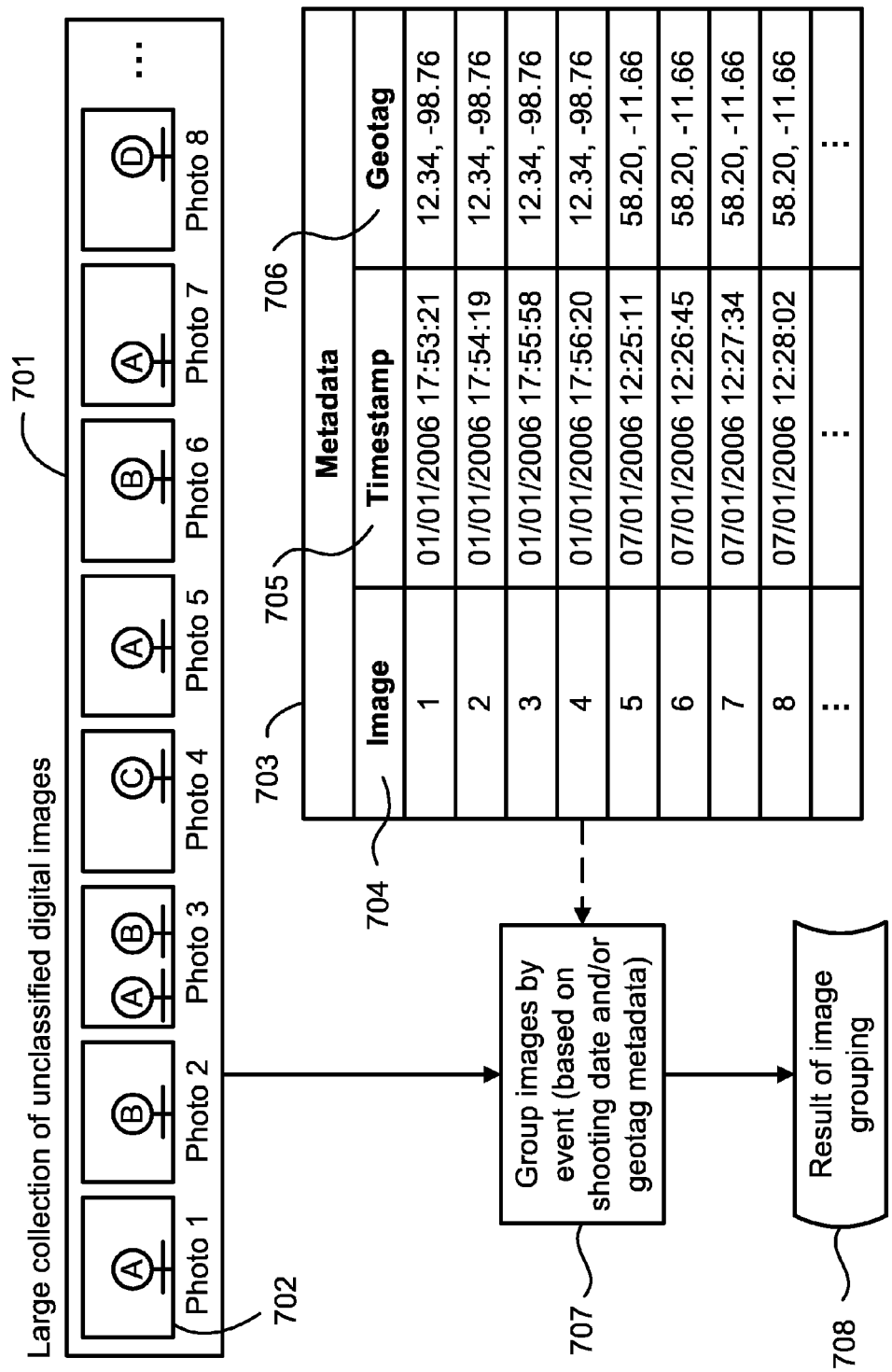
FIG. 7 is a flow diagram of a method for grouping a collection of images based on temporal and/or geographic metadata relating to the images in accordance with an embodiment of the present invention.

Step 410 is described in greater detail hereinafter with reference to FIG. 7. Referring to FIG. 7, the metadata 703 of the analysed image collection 701 is used to determine the location at which each image (e.g., image 702) was created or captured, at step 707. The metadata 703 for each particular image in the column 704 comprises an entry specifying the geographic coordinates in the column 706 (provided the functionality is available on the device which created the image) where the image was created. This information can then be used to group the images together based on the location/s where the images were taken or captured, at step 707. The result of step 707 is a record 708 specifying the geographic grouping of the images. With reference to FIG. 17A, the result may be recorded using, for example, a simple flat file database 1700, in which is recorded the unique geographic locations 1701 and unique identifiers of corresponding images 1702 taken in that same location.

Returning to FIG. 4, if temporal (timestamp) metadata is available for images (Yes), at step 411, the images are classified or sorted based on timestamp information (e.g., the date and/or time the images were captured) at step 412. If temporal metadata is not available for the image (No), processing proceeds directly to step 413 from step 411.

Temporal classification of images can be carried out in a similar way to geographic classification of images. Referring to FIG. 7, the metadata 703 for each of the images 701 in column 704 is analysed to group the images based on the related timestamp in column 705 of when the image was created.

Figure 17B:
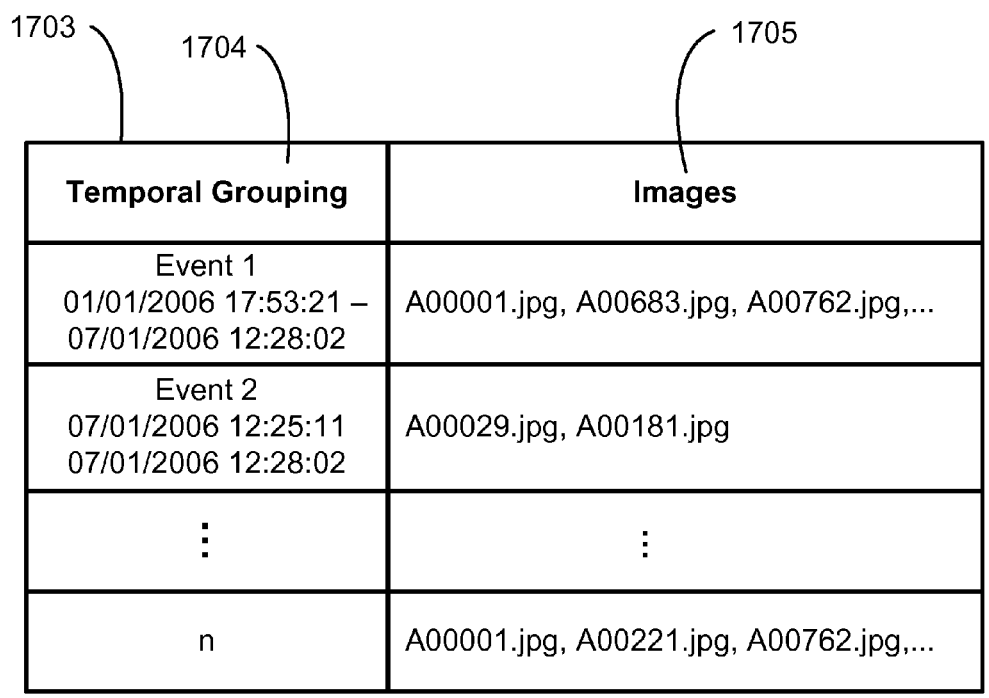
FIG. 17B is a table showing one possible data structure for use with temporal memory storage in embodiments of the present invention.

The result of step 707 is a record 708 specifying the temporal groupings of the images. With reference to FIG. 17B, the result may be recorded using, for example, a simple flat file database 1703, in which is recorded the unique temporal instances 1704 and the unique identifiers of corresponding images 1705 taken at the same time.

Returning to FIG. 4, a subset of images is created at step 413 based on occurrence of a person (i.e., face) and location and/or temporal data. An example of an implementation of a method or process for creating a subset of images is described hereinafter with reference to FIG. 16.

Figure 16:
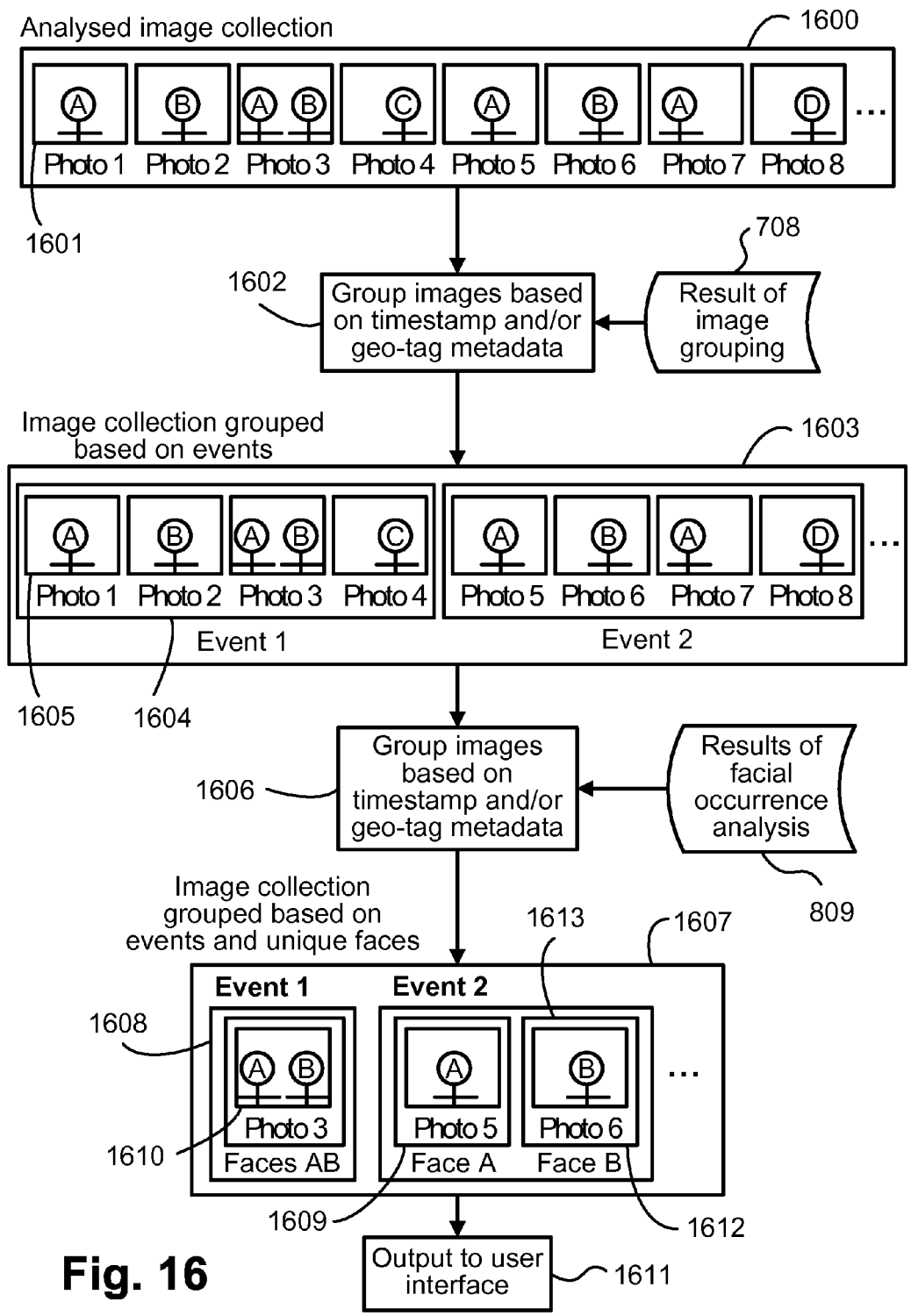
FIG. 16 is a flow diagram of a method for grouping a collection of images based on temporal and/or geographic metadata relating to the images and unique faces contained in the images in accordance with another embodiment of the present invention.

Referring to FIG. 16, the result 708 of the analysis described hereinbefore with reference to FIG. 7 is used to select relevant images 1601 from the image collection 1600. The images 1601 are arranged in groups at step 1602 based on temporal events and/or geographic locations where the images were taken. The groups in which the images are arranged depend on the type of metadata associated with the images. If the image collection 1600 includes both timestamp and geo-tag metadata, then both of these may be used as factors to group the images at step 1602. If only one of the metadata types is available for the image collection 1600, then only that metadata type is used to group the images from the image collection at step 1602. Similarly, if no metadata is available for an image collection then this type of image grouping is not carried out. The example described hereinafter assumes that both timestamp and geo-tag metadata are associated with the image collection 1600.

The result of the image grouping based on temporal and geographical metadata is an image collection grouped based on events 1603. Each image (e.g., image 1605) associated with a distinct temporal or geographical event is included in a distinct group of images (e.g., image group 1604) in the grouped image collection 1603. The grouped image collection 1603 is then used to further sort based on the distinct faces identified in the image collection which are likely to be of interest to the user at step 1606. Selection of a minimum number of images to present to the user may be performed in a similar manner to that described hereinbefore with reference to FIG. 15. The result of the facial occurrence analysis 809, described hereinbefore with reference to FIG. 8, is used to select a minimum collection of images 1607 from the image collection 1600. In this embodiment, a single image 1608 containing each unique face judged to be relevant to the user in the facial occurrence analysis results 809 is included in the final image collection 1607. The selection of the image 1610 to be included in the final image collection 1607 is implementation specific and may be carried out in a way to suit a particular implementation or embodiment. Some possibilities include, but are not limited to: selecting the image at random from the identified subset of images, selecting the image based on image quality (brightness, focus, etc.), and selecting an image which contains the most unique faces in a single image. Furthermore, a single image need not be selected for each unique face identified in the result of the facial occurrence analysis 809. That is, if one image contains multiple unique faces identified as important to the user, that image could be used. For example, Photo 3 1610 can be used for Event 1 1608 to represent the occurrence of both face A and face B in that particular event. However, Photo 5 1609 and Photo 6 1612 are used to represent face A and face B in Event 2 1613.

It can be seen from FIG. 16 that the selection steps 1602 and 1606 reduce the original image collection 1600 even more effectively than by only analysing and selecting faces likely to of interest to the user, such as in step 1002 of the embodiment described hereinbefore with reference to FIG. 10. In addition to analysing and grouping the images based on unique faces, step 1606 also groups the image collection based on the temporal event 1608 when the image was captured or the geographic location of capture. As a result, the grouped image collection 1607 is much more targeted towards the images that end user is likely to be interested in as the grouped image collection 1607 comprises a smaller subset of images compared to the original image collection 1600 and groups the relevant images together. This enables the user to search through the grouped image collection 1607 and select images of interest much more quickly. This makes the method effective for reducing the time required to select appropriate images and place an order. The method is particularly effective for kiosk environments on account of being largely automated and requiring minimum user interaction with the kiosk specific computer system 200.

The grouped image collection 1607 is then output or made available to the user via a user interface at step 1611.

An example of a user interface suitable for displaying the grouped images containing unique faces relevant to the user 1607 is shown in FIG. 14. In the example of FIG. 14, a single image 1402 representative of all the images grouped by a particular event are shown inside a window 1401. Each group of images relating to a particular event is also labelled (e.g., label 1403) to help the user distinguish between the different groups of images or events. The label may also include information such as the time span over which the images were taken.

The user may select to view greater detail of a group of images based on a particular event by clicking on the image representing a group of images 1402 or the name of the group 1403, in the group selection window 1401. This will cause the user interface to display the minimum number of images of each unique person judged to be important for the selected event 1608.

One example of a user interface suitable for displaying the grouped images comprising unique faces relevant to the user (generated at step 309 of FIG. 3) is shown in FIG. 11. In this example, each image (e.g., image 1102) from the reduced image collection 1103 is simply displayed as a list inside a window 1101. A label 1103 may also be added to help distinguish each image (e.g., image 1102).

Another embodiment is described hereinafter with reference to FIG. 13 which relates to an alternative implementation of the creation or generation of a subset of images based on occurrence of a person and location and/or temporal data 413 in the image collection 1300. This embodiment is substantially similar to the embodiment described hereinbefore with reference to FIG. 4, except that a subset of images is created based on occurrence of a person and location and/or temporal data 413.

Figure 13:
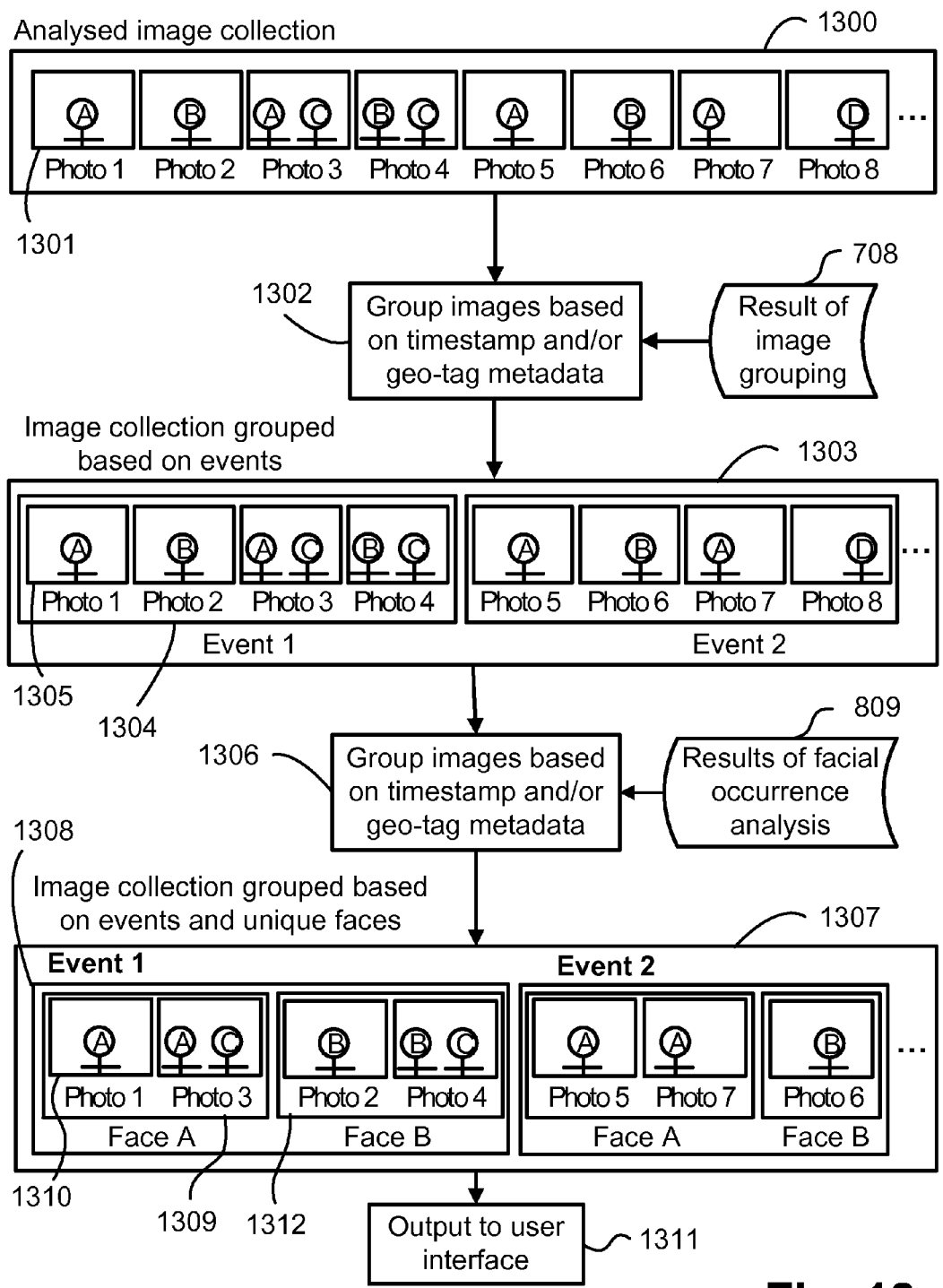
FIG. 13 is a flow diagram of a method for grouping a collection of images based on temporal and/or geographic metadata relating to the images and unique faces contained in the images in accordance with an embodiment of the present invention.

Referring to FIG. 13, the result of the image grouping 708 described hereinbefore with reference to FIG. 7 is used to select relevant images from the image collection 1300. The images (e.g., image 1301) from the image collection 1300 are arranged in groups based on temporal events (timestamp) and/or geographic locations (geo-tag metadata) where the image was captured, at step 1302. The groups in which the images are arranged depend on the type of metadata associated with the images. Thus, if the image collection 1300 includes timestamp and geo-tag metadata, then both of these are used as factors to group the images at step 1302. If only one of the metadata types is associated with the image collection 1300, then only that metadata type is used to group the images from the image collection 1300. Similarly, if no metadata is available for an image set then this type of image grouping is not carried out. The example described hereinafter assumes that both timestamp and geo-tag metadata associated with the image collection 1300 are available.

The result of the image grouping based on temporal and geographical metadata is an image collection grouped based on events 1303. Each image (e.g., image 1305) associated with a distinct temporal or geographical event is included in a distinct group of images such as the group of images 1304. The grouped image collection 1303 is then used to further sort based on the distinct faces identified in the image collection which are likely to be of interest to the user, at step 1306. Step 1306 is carried out by selecting all the images from the image collection 1303 in which a unique face appears which is above the threshold percentage. The identified unique faces are selected based on the results of the facial occurrence analysis 809 described hereinbefore with reference to FIG. 8, and images from the image collection 1303 in which each unique face appears are selected and/or extracted at step 1306. The images are grouped based on the unique faces (or combination thereof), which appear in the image collection 1303. The result of step 1306 is an image collection 1307, which is grouped firstly based on events (temporal or geographic classification) 1308 and secondly based on unique faces which occur more frequently in the image collection 1303 than the predetermined threshold 1309. For example, Event 1 1308 is further grouped to comprise only images of persons deemed to be important to the user (face A 1309 and face B 1312, for example). Grouping of images based on unique faces in an event group may be carried out either with respect to the event or the image collection 1308 as a whole 1300. That is, images comprising faces may be selected based on the frequency of occurrence within an event 1308 or the image collection as a whole 1300.

It can be seen from FIG. 13 that the selection steps 1302 and 1306 reduce the original image collection 1300 even more effectively than the step 1002 of FIG. 10, which only analyses faces likely to be of interest to the user. In addition to analysing and grouping the images based on unique faces, step 1306 also groups the image collection based on the temporal event 1308 when the image was captured or the geographic location of capture. As a result, the grouped image collection 1307 is much more targeted towards the images that the user is likely to be interested in as the grouped image collection 1307 comprises a smaller subset of images compared to the original image collection 1300 and groups the relevant images together. This enables the user to search through the grouped image collection 1307 and select images of interest much more quickly. This makes the method effective for reducing the time required to select appropriate images and place an order. The method is particularly effective for kiosk environments on account of being largely automated and requiring minimal user interaction with the kiosk specific computer system 200.

The grouped image collection 1307 is output or made available to the user via a user interface at step 1311. An example of a user interface suitable for displaying the grouped images containing unique faces relevant to the user 1307 is described hereinafter with reference to FIG. 14.

Referring to FIG. 14, a single image such as the image 1402 representative of all the images grouped by a particular event is shown inside a window 1401. Each group of unique events is also labelled (e.g., label 1403) to help the user distinguish between the different groups of images and/or events. The label may also include information such as the time span over which the images were taken or captured.

The user may select to view greater detail of a group of images based on a particular event by clicking on the image representing a group of images (e.g., the image 1402) or the name of the group 1403, in the group selection window 1401. This causes the user interface to display the window shown in FIG. 11.

FIG. 11 shows a similar window to that shown in FIG. 14 except that the images 1102 in FIG. 11 are grouped based on the unique faces included in the particular event selected for display in the window 1401 of FIG. 14. Each image such as the image 1402 is representative of a group of images comprising images including that unique face.

The user may select to view further images pertaining to a group of images comprising a particular face by clicking on the image representing a group of images 1102 or the name of the group 1103, in the group selection window 1101.

Referring to FIG. 12, the detailed view window 1201 is displayed when the user selects to view a group of images. The window 1201 displays all the images such as the image 1203 pertaining to that particular group 1204. The window 1201 is labelled using the label 1202 assigned for that particular group in the previous window 1101.

In another embodiment of the present invention, a subset of images can be selected that contain faces of persons who are likely to be close friends of the user. In this embodiment, if there is a choice between images that include faces having high scores (i.e., high values of the Count variable), the image having the least number of faces having a low score (i.e., low value of the Count variable) is selected.

In another embodiment of the present invention, a subset of images can be selected that show landscapes (i.e., few or no people). A tighter time frame is preferable for this embodiment and images that do not contain any high scoring faces (i.e., high values of the Count variable) and images that contain the least number of low scoring faces (i.e., low values of the Count variable) are selected.

In another embodiment of the present invention, the user interface for presenting the selected subset of images to the user has an additional capability to display additional images similar to those in the selected subset of images but that were not included in the selected subset of images. In this embodiment, similarity may, for example, be based on either time grouping of images or faces recognised in images.

The embodiments described hereinbefore are applicable to the computer and data processing industries and relate particularly to automatic selection of images from a large collection of images using facial recognition.

The foregoing describes only some embodiments of the present invention, and modifications and/or changes can be made thereto without departing from the scope and spirit of the invention, the embodiments being illustrative and not restrictive.

I Claim:

1. A method for selecting one or more images from a plurality of captured images, the method comprising steps of:
analyzing the plurality of captured images to recognize a plurality of faces in the plurality of captured images using a facial recognition process;
updating a count variable associated with each recognized face each time that recognized face is recognized in the plurality of captured images;
selecting a set of recognized faces from the plurality of recognized faces by, for each recognized face, comparing a value associated with that recognized face to a predetermined numerical threshold, the value being a ratio of an updated count variable associated with that recognized face relative to a total number of images in the plurality of captured images; and
selecting a reduced number of the plurality of captured images, which together include at least one instance of each of the selected recognized faces.

2. A method according to claim 1, wherein the reduced number of the plurality of captured images includes a minimal number of images, which together include at least one instance of each of the selected recognized faces.

3. A method according to claim 1, further comprising a step of grouping the plurality of captured images into one or more event sets based on at least one or more of temporal and geographical data relating to capture of each of the plurality of captured images.

4. A method according to claim 3, wherein the step of selecting a reduced number of the plurality of captured images includes a step of selecting from each event set, a minimum number of images, which together include at least one instance of each of the selected recognized faces existing in the event set.

5. A method for selecting one or more images from a plurality of captured images, the method comprising steps of:
   analyzing the plurality of captured images so as to recognize a plurality of faces in the plurality of captured images using a facial recognition process;
   updating a count variable associated with each recognized face each time that recognized face is recognized in the plurality of captured images;
   selecting a set of recognized faces from the plurality of recognized faces by, for each recognized face, comparing a value associated with that recognized face to a predetermined numerical threshold, the value being a ratio of an updated count variable associated with that recognized face relative to a total number of images in the plurality of captured images; and
   grouping the plurality of captured images into one or more event sets based on at least one or more of the date and location of capture of each of the plurality of captured images; and
   selecting from each event set, a reduced number of the plurality of captured images, which together include at least one instance of each of the selected recognized faces existing in the event set.

6. A computer system for selecting one or more images from a plurality of captured images, the computer system comprising:
   memory for storing data and program instructions;
   a video display for displaying information to a user; and
   a processor coupled to the memory and the video display, wherein the computer system is programmed to:
      analyze the plurality of captured images to recognize a plurality of faces in the plurality of captured images using a facial recognition process,
      update a count variable associated with each recognized face each time that recognized face is recognized in the plurality of captured images,
      select a set of recognized faces from the plurality of recognized faces by, for each recognized face, comparing a value associated with that recognized face to a predetermined numerical threshold, the value being a ratio of an updated count variable associated with that recognized face relative to a total number of images in the plurality of captured images, and
      select a reduced number of the plurality of captured images, which together include at least one instance of each of the selected recognized faces.

7. A computer system according to claim 6, wherein the reduced number of the plurality of captured images includes a minimal number of images, which together include at least one instance of each of the selected recognized faces.

8. A computer system according to claim 6, further programmed to group the plurality of captured images into one or more event sets based on at least one or more of temporal and geographical data relating to capture of each of the plurality of captured images.

9. A computer system according to claim 8, further programmed to select from each event set, a minimum number of images, which together include at least one instance of each of the selected recognized faces existing in the event set.

10. A computer system according to claim 6, wherein the video display comprises a touch screen for displaying information to and receiving input from a user.

11. A computer system for selecting one or more images from a plurality of captured images, the computer system comprising:
   memory for storing data and program instructions;
   a video display for displaying information to a user; and
   a processor coupled to the memory and the video display, wherein the computer system is programmed to:
      analyze the plurality of captured images so as to recognize a plurality of faces in the plurality of captured images using a facial recognition process,
      update a count variable associated with each recognized face each time that recognized face is recognized in the captured images,
      select a set of recognized faces from the plurality of recognized faces by, for each recognized face, comparing a value associated with that recognized face to a predetermined numerical threshold, the value being a ratio of an updated count variable associated with that recognized face relative to a total number of images in the images,
      group the plurality of captured images into one or more event sets based on at least one or more of the date and location of capture of each of the plurality of captured images, and
      select from each event set, a reduced number of the plurality of captured images, which together include at least one instance of each of the selected recognized faces existing in the event set.

12. A computer program product comprising a non-transitory computer-readable medium having a computer program recorded therein for selecting one or more images from a plurality of captured images, the computer program product comprising:
   computer program code for analyzing the plurality of captured images to recognize a plurality of faces in the plurality of captured images using a facial recognition process;
   computer program code for updating a count variable associated with each recognized face each time that recognized face is recognized in the plurality of captured images;
   computer program code for selecting a set of recognized faces from the plurality of recognized faces by, for each recognized face, comparing a value associated with that recognized face to a predetermined numerical threshold, the value being a ratio of an updated count variable associated with that recognized face relative to a total number of images in the plurality of captured images; and
   computer program code for selecting a reduced number of the plurality of captured images, which together include at least one instance of each of the selected recognized faces.

13. A computer program product according to claim 12, wherein the reduced number of the plurality of captured images includes a minimal number of images, which together include at least one instance of each of the selected recognized faces.

14. A computer program product according to claim 12, further comprising computer program code for grouping the plurality of captured images into one or more event sets based on at least one or more of temporal and geographical data relating to capture of each of the plurality of captured images.

15. A computer program product according to claim 14, wherein the computer program code for selecting a reduced number of the plurality of captured images includes computer program code for selecting from each event set, a minimum number of images, which together include at least one instance of each of the selected recognized faces existing in the event set.

16. A computer program product comprising a non-transitory computer-readable medium having a computer program recorded therein for selecting one or more images from a plurality of captured images, the computer program product comprising:

computer program code for analyzing the plurality of captured images so as to recognize a plurality of faces in the plurality of captured images using a facial recognition process;

computer program code for updating a count variable associated with each recognized face each time that recognized face is recognized in the captured images;

computer program code for selecting a set of recognized faces from the plurality of recognized faces by, for each recognized face, comparing a value associated with that recognized face to a predetermined numerical threshold, the value being a ratio of an updated count variable associated with that recognized face relative to a total number of images in the plurality images;

computer program code for grouping the plurality of captured images into one or more event sets based on at least one or more of the date and location of capture of each of the plurality of captured images; and computer program code for selecting from each event set, a reduced number of the plurality of captured images, which together include at least one instance of each of the selected recognized faces existing in the event set.

\* \* \* \* \*